(12) United States Patent
Kalva et al.

(10) Patent No.: US 12,291,219 B2
(45) Date of Patent: May 6, 2025

(54) ASYNCHRONOUS IN-SYSTEM TESTING FOR AUTONOMOUS SYSTEMS AND APPLICATIONS

(71) Applicant: NVIDIA Corporation, Santa Clara, CA (US)

(72) Inventors: Anitha Kalva, San Jose, CA (US); Jae Wu, Los Gatos, CA (US); Shantanu Sarangi, Saratoga, CA (US); Sailendra Chadalavada, Saratoga, CA (US); Milind Sonawane, Santa Clara, CA (US); Chen Fang, Shanghai (CN); Abilash Nerallapally, Newark, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 327 days.

(21) Appl. No.: 18/048,952

(22) Filed: Oct. 24, 2022

(65) Prior Publication Data

US 2024/0132083 A1 Apr. 25, 2024
US 2024/0227824 A9 Jul. 11, 2024

(51) Int. Cl.
*B60W 50/02* (2012.01)
*B60W 50/00* (2006.01)

(52) U.S. Cl.
CPC . *B60W 50/0205* (2013.01); *B60W 2050/0044* (2013.01)

(58) Field of Classification Search
CPC ....... B60W 50/0205; B60W 2050/0044; G06F 11/36
See application file for complete search history.

(56) References Cited

U.S. PATENT DOCUMENTS

| | | | |
|---|---|---|---|
| 10,998,041 B1* | 5/2021 | Avraham | G11C 29/028 |
| 2008/0151761 A1* | 6/2008 | Theisen | H04W 24/08 |
| | | | 370/241 |
| 2012/0117436 A1* | 5/2012 | Portolan | G01R 31/318563 |
| | | | 714/738 |
| 2013/0311034 A1* | 11/2013 | Falkenstein | B60W 20/00 |
| | | | 701/33.7 |
| 2018/0285364 A1* | 10/2018 | Mamidipaka | G06F 16/24578 |
| 2020/0145301 A1* | 5/2020 | Grinkemeyer | H04H 20/12 |
| 2021/0019063 A1* | 1/2021 | Lee | G06F 11/1484 |
| 2021/0055885 A1* | 2/2021 | Strathman | G06F 3/0665 |
| 2022/0129362 A1* | 4/2022 | Beijbom | B60W 50/04 |

\* cited by examiner

*Primary Examiner* — Donald J Wallace
*Assistant Examiner* — Jalal C Coduroglu
(74) *Attorney, Agent, or Firm* — Maschoff Brennan

(57) ABSTRACT

Systems and methods are disclosed that relate to testing processing elements of an integrated processing system. A first system test may be performed on a first processing element of an integrated processing system. The first system test may be based at least on accessing a test node associated with the first processing element. The first system test may be accessed using a first local test controller. A second system test may be performed on a second processing element of the integrated processing system. The second system test may be based at least on accessing a second test node associated with the second processing element. The second system test may be accessed using a second local test controller.

19 Claims, 8 Drawing Sheets

ASYNCHRONOUS IN-SYSTEM TESTING FOR AUTONOMOUS SYSTEMS AND APPLICATIONS

BACKGROUND

Testing one or more processing elements of a processing system may be performed by testing different portions of the processing systems (e.g., testing different sets of one or more processing elements of the processing system). Some testing, such as runtime in-system testing, may include a joint test action group (JTAG) node accessing a specific portion of the processing system. During this in-system testing, other portions of the processing system may not be able to perform in-system testing due to limitations of a test controller performing the test. Further, as additional processing elements are included in a portion, a length of time before another portion is tested may increase, which may delay testing and/or runtime of the associated processing elements of the processing system.

In some traditional implementations, the JTAG node may support runtime in-system testing of one portion or a predetermined and fixed number of portions at a time. For example, in instances in which runtime in-system testing is performed on a first portion of the processing system, a second portion of the processing system may not be allowed to perform other operations, which may include performing runtime in-system testing. Further, in instances in which a number of processing elements included in the first portion of the processing system increases, an amount of time that may pass before the second portion is allowed to perform other operations, including runtime in-system testing, may also increase, as the runtime in-system testing may be performed serially among the portions of the processing system. For example, the second portion may begin runtime in-system testing after the completion of runtime in-system testing of the first portion.

SUMMARY

Embodiments of the present disclosure relate to applications and platforms for performing asynchronous runtime in-system testing on one or more processing elements of a processing system. Systems and methods are disclosed that relate to a first local test controller accessing a first joint test action group (JTAG) node associated with a first processing element to perform a first system test on the first processing element, where the first processing element may be a component of an integrated processing system. Additionally, a second test controller may access a second JTAG node associated with a second processing element to perform a second system test on the second processing element, which may be performed independently from the first system test on the first processing element. As a result, and in contrast to traditional or existing solutions, two or more instances of in-system testing may be performed on two or more processing elements independently and at least partially in parallel.

BRIEF DESCRIPTION OF THE DRAWINGS

The present systems and methods for asynchronous in-system testing are described in detail below with reference to the attached drawing figures, wherein.

DETAILED DESCRIPTION

Figure 1:
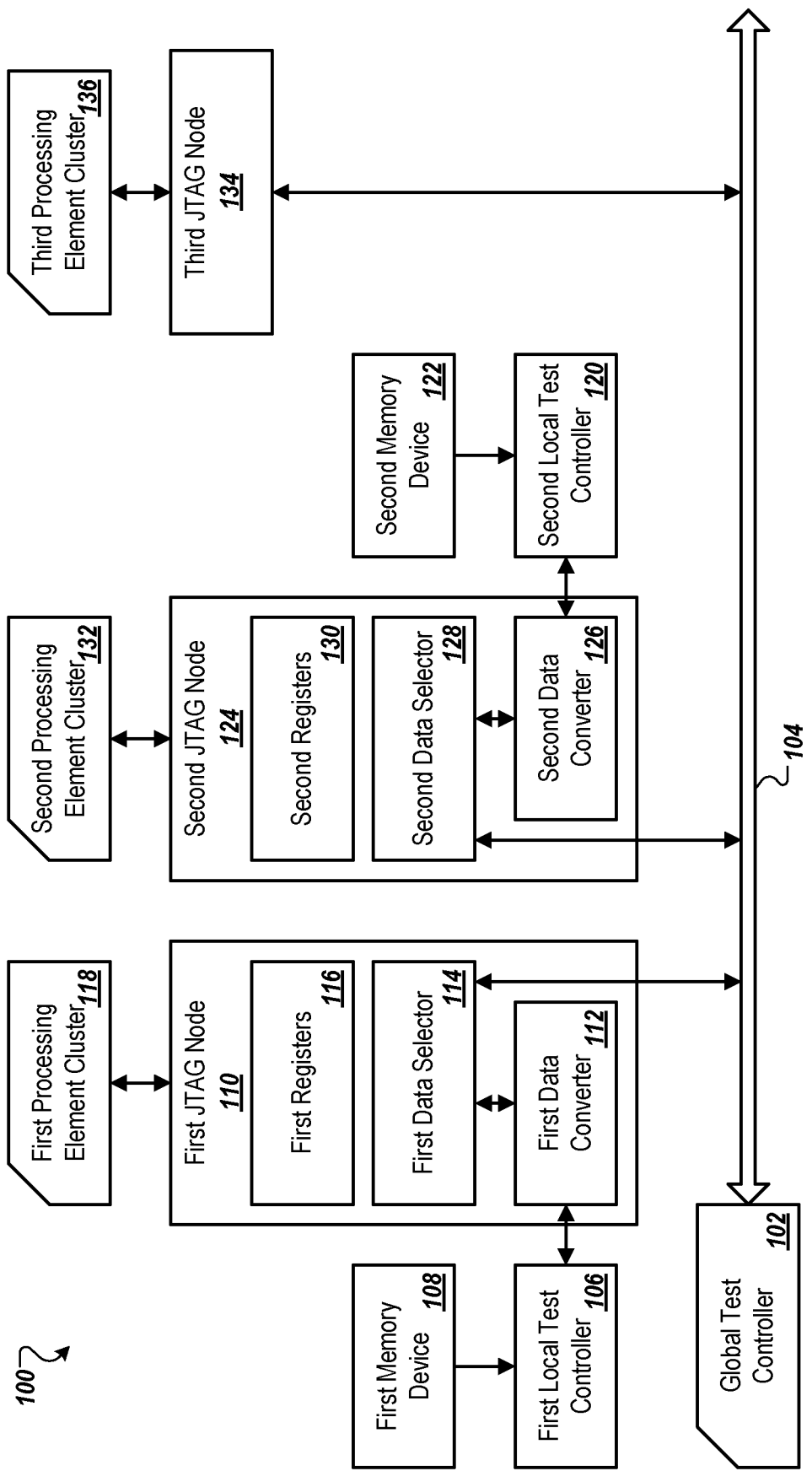
FIG. 1 illustrates an example system configured to perform asynchronous runtime in-system testing, according to one or more embodiments of the present disclosure.

Systems and methods are disclosed related to asynchronous in-system testing. Although the present disclosure may be described with respect to an example autonomous or semi-autonomous vehicle 300 (alternatively referred to herein as "vehicle 300" or "ego-machine 300," an example of which is described with respect to FIGS. 3A-3D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described primarily with respect to in-system testing for autonomous or semi-autonomous machine hardware, this is not intended to be limiting, and the systems and methods described herein may be used in augmented reality, virtual reality, mixed reality, robotics, security and surveillance, autonomous or semi-autonomous machine applications, and/or any other technology spaces where in-system testing may be used.

At a high level, some processing systems may be configured to perform one or more electronic or processing tasks. In some circumstances, processing systems may include multiple processing elements that may operate independently of one another. For example, the processing systems may include two or more CPU cores, two or more threads or warps of a GPU, etc., operating independently of one another. At any time, one or more processing elements of a processing system may experience faults, failures, and/or other lapses in performance. Testing the processing system may contribute to detecting faults, which in turn, may contribute to a reduced downtime of one or more of the processing elements and/or the associated processing system, and/or may allow for deactivating or ignoring outputs of one or more processing elements where a fault is detected.

For example, where a fault is detected in a processing unit(s) of an autonomous or semi-autonomous machine, the outputs of the processing unit(s) may be ignored by one or more downstream components or systems—at least until the fault can be remedied.

In some circumstances, testing the multiple processing elements may be performed using a joint test action group (JTAG) network where individual sets of one or more processing elements of the multiple processing elements may include an associated JTAG node. In the present disclosure, processing elements that correspond to a same JTAG node (or other testing node type) may be referred to as "clusters" or "processing element clusters." Further, a "cluster" may include only one processing element or multiple processing elements. In addition, reference to a cluster or processing element cluster may refer to the processing elements included in such cluster.

In some embodiments of the present disclosure, one or more JTAG nodes (or other testing node types) may have a respective test controller (e.g., a runtime in-system test controller) locally associated therewith—by extension, the clusters associated with these JTAG nodes may also have a respective test controller locally associated therewith. The test controllers locally associated with the JTAG nodes and corresponding clusters may be referred to as "local test controllers" or "local controllers" in the present disclosure. Further, reference to the term "local" is meant to convey being specifically associated with one or more corresponding JTAG nodes and clusters and is not necessarily limiting with respect to physical location with respect to such components.

The local controllers may allow independent system testing of an associated cluster without causing other clusters in a processing system to perform system testing (e.g., other processing elements may continue performing one or more electronic tasks). For example, a first local controller may access a first JTAG node associated with a first cluster to perform a first system test with respect to the first cluster. Further, the first local controller may allow for a second cluster to perform electronic tasks without also performing system testing. Additionally, or alternatively, in instances in which the first controller is performing the first system test with respect to the first cluster as described herein, a second controller may be configured to access a second JTAG node associated with the second cluster to perform a second system test with respect to the second cluster independently from the first system test being performed with respect to the first cluster.

The local controllers implemented according to the present disclosure may allow for asynchronous testing of different processing elements of a processing system by initiating testing of a corresponding cluster independently of other clusters. The asynchronous testing may reduce downtime resulting from testing by allowing for individually selecting clusters to be tested while also allowing other clusters to continue operations. Further, the individual selection may allow for more efficient testing. For example, one or more clusters that are currently idle (e.g., not performing any electronic tasks) may be selected for testing while other clusters that are not idle may be allowed to continue operations, which may further reduce interference with electronic tasks performed by the processing system. Alternatively, or additionally, the local controller may allow multiple clusters to be tested in parallel, which may reduce an overall length of testing associated with the processing system. For example, a first cluster and a second cluster may initiate testing in overlapping time frames as opposed to testing the second cluster after testing of the first cluster has finished, or vice versa.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

Referring now to FIG. 1, FIG. 1 illustrates an example system 100 configured to perform asynchronous runtime in-system testing, according to one or more embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

In some embodiments, the system 100 may include a first local test controller 106 (or "first local controller 106"), a first memory device 108, a first JTAG node 110, a second local test controller 120 (or "second local controller 120"), a second memory device 122, a second JTAG node 124, and a third JTAG node 134. In some embodiments, the first JTAG node 110 may include a first data converter 112, a first data selector 114, and first registers 116. In some embodiments, the second JTAG node 124 may include a second data converter 126, a second data selector 128, and second registers 130. In some embodiments, the system 100 may be configured to allow asynchronous runtime in-system testing of a first processing element cluster 118 and/or a second processing element cluster 132 (as described herein) which may allow runtime in-system testing to be performed at any time the first processing element cluster 118 and/or the second processing element cluster 132 may be available to perform runtime in-system testing.

In some embodiments, one or more components in the system 100 may be the same or similar as other components in the system 100 and may be configured to perform substantially similar operations and/or functions. For example, the first local controller 106, the first memory device 108, the first JTAG node 110, the first data converter 112, the first data selector 114, and/or the first registers 116 (collectively referred to as the first components) may be the same or similar to the second local controller 120, the second memory device 122, the second JTAG node 124, the second data converter 126, the second data selector 128, and/or the second registers 130 (collectively referred to as the second components), respectively. Additionally, the operations that may be performed by the first components with respect to the first processing element cluster 118 may be the same or similar as the operations that may be performed by the second components with respect to the second processing element cluster 132.

In some embodiments, one or more components in the system 100 may be included in an individual die and/or fabricated on a single block of semiconductor material. For example, the first local controller 106, the first JTAG node 110, the first data converter 112, the first data selector 114, the first registers 116, the first processing element cluster 118, the second local controller 120, the second JTAG node 124, the second data converter 126, the second data selector 128, the second registers 130, and/or the second processing element cluster 132 may be included in a first die. In some embodiments, the first memory device 108 and/or the second memory device 122 may be included in the first die, as described herein. Alternatively, or additionally, the first memory device 108 and/or the second memory device 122 may be included in a second die.

In some embodiments, the first JTAG node 110 may be communicatively coupled with the first processing element cluster 118. In some embodiments, the first JTAG node 110 may be configured to contribute to performing testing on the first processing element cluster 118, such as runtime in-system testing on the first processing element cluster 118. In some embodiments, the first JTAG node 110 may obtain test instructions to be provided to the first processing element cluster 118 as part of the runtime in-system testing.

In some embodiments, the first JTAG node 110 may include one or more components that may contribute to runtime in-system testing of the first processing element cluster 118, such as the first data converter 112, the first data selector 114, and/or the first registers 116. The first data converter 112 may be configured to change a format of obtained test instructions which may allow the test instructions to be used by the first processing element cluster 118. The first data selector 114 may be configured to select a mode, and thereby a data communication channel, which may be based on a current state of the first local controller 106. The first registers 116 may programmed based on the current state of the first local controller 106 and may be used in conjunction with performing runtime in-system test on the first processing element cluster 118, as further described herein.

In some embodiments, the system 100 may include a global test controller 102. The global test controller 102 may be communicatively coupled with the first JTAG node 110, the second JTAG node 124, and/or the third JTAG node 134, such as via a data bus 104. In some embodiments, the global test controller 102 may be configured to communicate with the first processing element cluster 118, the second processing element cluster 132, and/or the third processing element cluster 136, such as via first JTAG node 110, the second JTAG node 124, and/or the third JTAG node 134, respectively. In some embodiments, the global test controller 102 may be configured to perform various testing operations on the first processing element cluster 118, the second processing element cluster 132, and/or the third processing element cluster 136, which may include runtime in-system testing, among others. In these or other embodiments, the global test controller 102 may perform data communications via the data bus 104. In the present disclosure, reference to the term "global" with respect to the global test controller 102 may be used to differentiate from the local test controllers in that the global test controller 102 may be configured to interface with processing element clusters (e.g., via multiple corresponding JTAG nodes) that may correspond to different local test controllers and/or that may also not have a local test controller associated therewith.

In some embodiments, the first processing element cluster 118, the second processing element cluster 132, and/or the third processing element cluster 136 may individually include one or more processing elements, and may be included in a processing system. In some embodiments, the first processing element cluster 118, the second processing element cluster 132, and/or the third processing element cluster 136 may individually be configured to perform testing operations, such as runtime in-system testing as described herein, and/or may be configured to perform operational functions, which may include the performance of various electronic tasks that may or may not be associated with testing. In these or other embodiments, the first processing element cluster 118, the second processing element cluster 132, and/or the third processing element cluster 136 may individually be configured for testing operations and/or other operational functions based on a current state of a respective local controller and/or the global test controller 102.

In some embodiments, the first local controller 106 may be communicatively coupled to the first processing element cluster 118 and/or the second local controller 120 may be communicatively coupled to the second processing element cluster 132, such that the first local controller 106 and/or the second local controller 120 may contribute to and/or direct runtime in-system testing on the first processing element cluster 118 and/or the second processing element cluster 132, respectively. Alternatively, or additionally, the first local controller 106 may be communicatively coupled to the first JTAG node 110, which may be communicatively coupled to the first processing element cluster 118, such that the first local controller 106 may be communicatively coupled to the first processing element cluster 118 via the first JTAG node 110. Similarly, the second local controller 120 may be communicatively coupled to the second JTAG node 124, which may be communicatively coupled to the second processing element cluster 132, such that the second local controller 120 may be communicatively coupled to the second processing element cluster 132 via the second JTAG node 124.

In some embodiments, the third processing element cluster 136 may be communicatively coupled to the third JTAG node 134, which may be communicatively coupled to the global test controller 102 via the data bus 104. In some embodiments, the third processing element cluster 136 and the third JTAG node 134 may be included in the system 100 to illustrate that a local test controller may not be associated with every processing element cluster and/or JTAG node included in a processing system. In such instances, the global test controller 102 may direct the performance of various system tests associated with the third processing element cluster 136 via the third JTAG node 134.

In some embodiments, the system 100 may include a global test controller 102. The global test controller 102 may be communicatively coupled to the first JTAG node 110 and the second JTAG node 124 via the data bus 104. The global test controller 102 may be configured to distribute data, instructions, and/or other communications to connected components (e.g., the first JTAG node 110 and/or the second JTAG node 124) via the data bus 104. In some embodiments, the global test controller 102 may be configured to initiate and/or perform one or more testing operations on the first processing element cluster 118 and/or the second processing element cluster 132 via the first JTAG node 110 and/or the second JTAG node 124, respectively. For example, the global test controller 102 may be configured to cause key-on and/or key-off system testing to be performed on the first processing element cluster 118 such as by providing test instructions to the first JTAG node 110 via the data bus 104.

In some embodiments, the first local controller 106 may include code and routines configured to allow one or more computing devices to perform one or more operations. Additionally, or alternatively, the first local controller 106 may be implemented using hardware including one or more processors, central processing units (CPUs), graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), and/or other processor types. In some other instances, the first local controller 106 may be implemented using a combination of hardware and software. In the present disclosure, operations described as being performed by the first local controller 106 may include operations that the first local controller 106 may direct a corresponding system to perform.

In some embodiments, the first local controller 106 may interface with the first JTAG node 110, where the interface may support transmissions of at least data and/or instructions to the first JTAG node 110 and/or components associated with the first JTAG node 110. For example, in some embodiments, the first local controller 106 may be communicatively coupled with the first JTAG node 110 and the first local controller 106 may transmit data and/or instructions to the first JTAG node 110, such as in conjunction with runtime in-system testing for the first processing element cluster 118 via the first JTAG node 110. In another example, the first local controller 106 may be communicatively coupled with a data converter (e.g., the first data converter 112) associated with the first JTAG node 110, and the first local controller 106 may transmit data and/or instructions to the data converter, as described herein. In general, the first local controller 106 may be configured to access JTAG network elements, such as the first JTAG node 110, and the first local controller 106 may be configured to cause JTAG related functions or operations to be performed, such as runtime in-system testing, as described herein.

In these or other embodiments, the first local controller 106 may be configured to initiate and/or cease runtime in-system testing on the first processing element cluster 118 via the first JTAG node 110. For example, the first local controller 106 may obtain one or more test instructions associated with runtime in-system testing and the first local controller 106 may provide the test instructions to the first JTAG node 110 and/or a component associated with the first JTAG node 110, as described herein. In some embodiments, the first local controller 106 may obtain the test instructions from the first memory device 108. The test instructions may include test data and/or a test sequence that may be used as part of runtime in-system testing by the first processing element cluster 118. In some embodiments, the test instructions may be associated with the one or more processing elements included in the first processing element cluster 118. In these or other embodiments, the first local controller 106 may obtain the test instructions from the first memory device 108 such that the association between the test instructions and the one or more processing elements of the first processing element cluster 118 may be via the first JTAG node 110.

In some embodiments, the test instructions associated with runtime in-system testing and obtained by the first local controller 106 may include a first format. For example, the test instructions stored within the first memory device 108 may include a first format. In some embodiments, the test instructions having the first format may be provided by the first local controller 106 directly to the first JTAG node 110 in conjunction with runtime in-system testing. Alternatively, or additionally, in some embodiments, the test instructions having the first format may be converted from the first format to a second format before being used as part of runtime in-system testing by the first JTAG node 110.

For example, in some embodiments, the first data converter 112 may be configured to obtain the test instructions provided by the first local controller 106 and may be configured to convert the test instructions from the first format to the second format. The first format may include one or more data formats that may be unrecognizable and/or inaccessible by the first JTAG node 110 and the second format may be recognizable and/or accessible by the first JTAG node 110. In some embodiments, the second format may be the same or similar as a format associated with test instructions that may be transmitted by the global test controller 102, such as via the data bus 104. For example, the second format may include a wrapper serial bus (WSC) format, or a WSC protocol, such that the test instructions may be recognized and/or accessible by the first JTAG node 110.

In some embodiments, the first data selector 114 may be configured to select between (e.g., operate as a multiplexer with respect to) a first selector mode and a second selector mode, as described herein. In some embodiments, the first data selector 114 may be configured to make a selection between the first selector mode and the second selector mode based on an operational state of the first local controller 106. For example, in instances in which the first local controller 106 is in a first local test controller active state (or "first active state"), the first data selector 114 may select the first selector mode, which may include the first data selector 114 being configured to allow data to be communicated between the first local controller 106 and the first processing element cluster 118. In instances in which the first local controller 106 is in a first local test controller inactive state (or "first inactive state"), the first data selector 114 may select the second selector mode, which may include the first data selector 114 configured to allow data to be communicated between the data bus 104 and the first processing element cluster 118. Alternatively, or additionally, in instances in which the first local controller 106 is in the first inactive state (and, by extension, the first data selector 114 is in the second selector mode), the first processing element cluster 118 may be configured to perform general operations (e.g., operations not included in and/or associated with runtime in-system testing). Further, although described relative to the first data selector 114, the functionality of the first data selector 114 with respect to the first selector mode and/or the second selector mode as described herein may be applicable to the second data selector 128, with respect to a second active state and/or the second inactive state of the second local controller 120.

In some embodiments, in instances in which the first data selector 114 is in the first selector mode, the first data selector 114 may be configured to limit or block a communication of data between the data bus 104 and the first processing element cluster 118. For example, in the first selector mode, data may not be communicated between the first processing element cluster 118 and the data bus 104. Alternatively, or additionally, in instances in which the first data selector 114 is in the second selector mode, the first data selector 114 may be configured to limit or block the communication of data between the first local controller 106 and the first processing element cluster 118. For example, in the second selector mode, data may not be communicated between the first processing element cluster 118 and the first local controller 106.

In some embodiments, the output from the global test controller 102 may include at least the second format, such as the WSC format, which may be recognized and/or accessible by the first JTAG node 110. For example, in some embodiments, the global test controller 102 may include an internal data converter, such that an output from the global test controller 102 may not be input to the first data converter 112 to be recognized and/or accessible by the first JTAG node 110. In these or other embodiments, the first data converter 112 may therefore be omitted in some instances.

In some embodiments, the first active state of the first local controller 106 may indicate that the first local controller 106 may be configured and/or prepared to execute runtime in-system testing on the first processing element cluster 118 via the first JTAG node 110. Alternatively, the first inactive state of the first local controller 106 may indicate the first local controller 106 is not configured and/or prepared to execute runtime in-system testing on the first processing element cluster 118, such that the first JTAG node 110 may be disengaged from the first processing element cluster 118 or the first JTAG node 110 may receive test instructions from the global test controller 102 via the data bus 104.

In some embodiments, in instances in which the first local controller 106 enters the first active state, the first local controller 106 may transmit a first signal to the first JTAG node 110. In some embodiments, in response to receiving the first transmitted signal from the first local controller 106, the first registers 116 may be programmed to be configured for a first register mode. The first register mode may be associated with a performance of runtime in-system testing operations by the first JTAG node 110 with respect to the first processing element cluster 118, in association with the first local controller 106. Further, the instructions for programming the first registers 116 for the first register mode may be obtained by the first local controller 106 from the first memory device 108.

In some embodiments, in instances in which the first local controller 106 enters the first inactive state, the first local controller 106 may transmit a second signal to the first JTAG node 110. In some embodiments, in response to receiving the second transmitted signal from the first local controller 106, the first registers 116 may be configured for a second register mode. The second register mode may indicate the first local controller 106 may not be directing runtime in-system testing via the first JTAG node 110 and/or directing other operations associated with the first JTAG node 110.

Alternatively, or additionally, in instances in which the first JTAG node 110 receives the second signal to initiate the second register mode, the first registers 116 and/or the first JTAG node 110 may be responsive to testing instructions and/or operational instructions from another system or device, such as the global test controller 102. For example, in the second register mode, the first JTAG node 110 may be configured to receive testing instructions from the global test controller 102 via the data bus 104, which may include runtime in-system testing not directed by the first local controller 106, which may not include asynchronous and/or independent runtime in-system testing. Alternatively, or additionally, in instances in which the second signal is received in association with the second register mode, the first processing element cluster 118 may be configured for an operational mode. In the operational mode, the first processing element cluster 118 may be configured to perform operations that may not be directed and/or caused by the first local controller 106, such as operations not including runtime in-system testing and/or testing operations dictated by the global test controller 102.

Alternatively, in instances in which the first local controller 106 is in the first inactive state, communications may be limited and/or disconnected between the first JTAG node 110 and the first processing element cluster 118, such as with respect to the first local controller 106. For example, in response to the first local controller 106 transmitting the second signal, communications may cease between the first local controller 106 and the first JTAG node 110 and/or communications may cease between the first JTAG node 110 and the first processing element cluster 118. Further, the instructions for programming the first registers 116 for the second register mode (e.g., adjusting the first registers 116 from the first register mode to the second register mode) may be obtained by the first local controller 106 from the first memory device 108.

In some embodiments, the first local controller 106 and the second local controller 120 may be configured to initiate runtime in-system testing in the first processing element cluster 118 and the second processing element cluster 132 via the first JTAG node 110 and the second JTAG node, respectively. In some embodiments, the first local controller 106 and the second local controller 120 may be configured to asynchronously and/or independently initiate runtime in-system testing in the first processing element cluster 118 and the second processing element cluster 132, respectively. For example, runtime in-system testing may be initiated in the first processing element cluster 118 by the first local controller 106 at a first time, and runtime in-system testing may be initiated in the second processing element cluster 132 by the second local controller 120 at a second time. The second time may be the same as the first time, or any time before or after the first time. For example, the first local controller 106 may access the first JTAG node 110 to perform a first system test on the first processing element cluster 118 and while the first system test is executing (e.g., before the first system test has concluded), the second local controller 120 may access the second JTAG node 124 to perform a second system test on the second processing element cluster 132.

Modifications, additions, or omissions may be made to the system 100 without departing from the scope of the present disclosure. For example, in some embodiments, the system 100 may include any number of other components, actions, or inputs that may not be explicitly illustrated or described. Further, the number of JTAG nodes, local test controllers, processing element clusters, etc., may vary. In addition, although the local test controllers of FIG. 1 are depicted and described as corresponding to one JTAG node and corresponding processing element cluster, such a description is not meant to be limiting. For example, a single local test controller may be communicatively coupled to and associated with more than one JTAG node and/or processing element cluster. In such embodiments, the single test controller may be configured to perform testing operations with respect to the multiple processing element clusters associated therewith in a similar manner to that described herein. In these or other embodiments, the global test controller 102 may be differentiated from local test controllers that are associated with multiple processing element clusters in that the global test controller 102 may be configured to control testing over multiple processing element clusters that are associated with at least two different local test controllers and/or that are not associated with any local test controller.

In some embodiments, the second local controller 120 may be communicatively coupled to the first memory device 108 and the second memory device 122 may not be included in the system 100. For example, the test instructions associated with runtime in-system testing of the second processing element cluster 132 may be stored in the first memory device 108, which may store test instructions associated with runtime in-system testing of the first processing element cluster 118. In these or other embodiments, the first memory device 108 may be configured to store test instructions associated with runtime in-system testing of one or more processing element clusters (e.g., at least the first processing element cluster 118 and/or the second processing element cluster 132).

Figure 2:
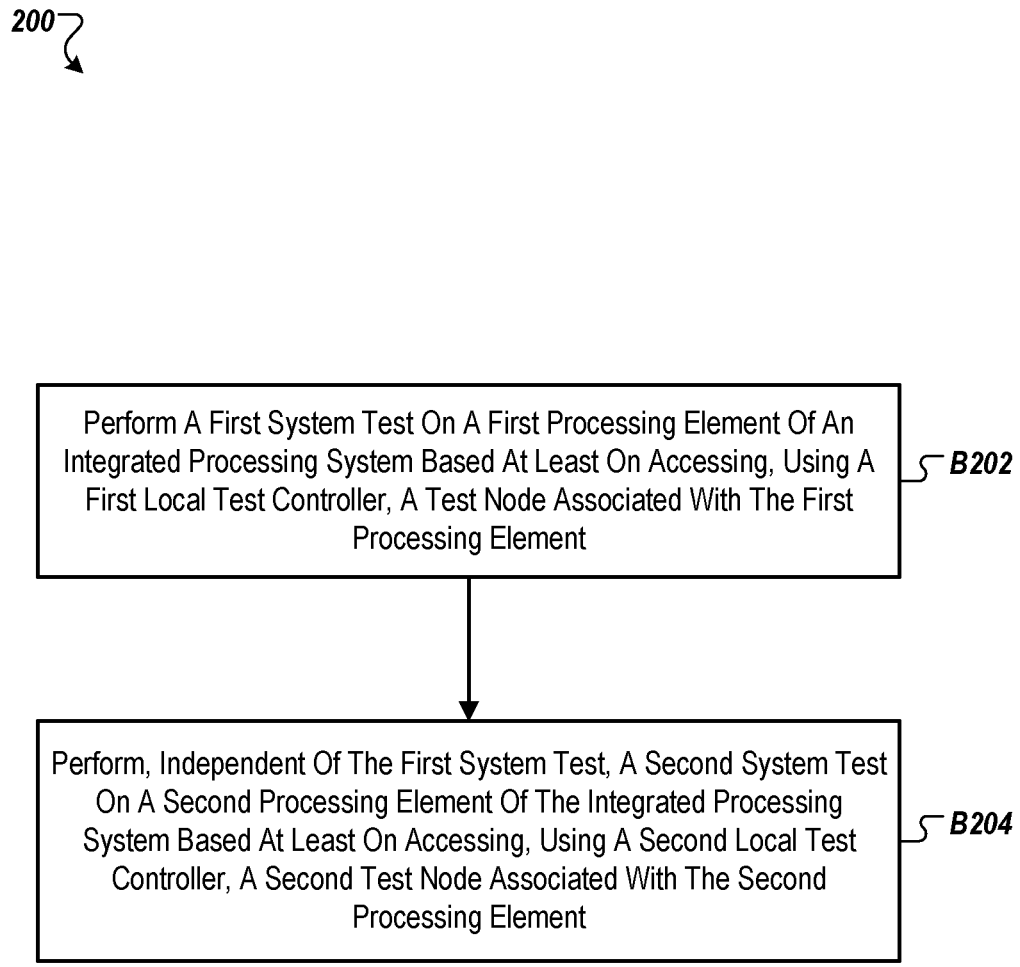
FIG. 2 illustrates an example method for performing asynchronous runtime in-system testing, according to one or more embodiments of the present disclosure.

FIG. 2 illustrates an example method 200 for performing asynchronous runtime in-system testing, according to one or more embodiments of the present disclosure. Each block of method 200, described herein, may comprise a computing process that may be performed using any combination of hardware, firmware, and/or software. For instance, various functions may be carried out by a processor executing instructions stored in memory. The method 200 may also be embodied as computer-usable instructions stored on computer storage media. The method 200 may be provided by a standalone application, a service or hosted service (standalone or in combination with another hosted service), or a plug-in to another product, to name a few. In addition, the method 200 is described, by way of example, with respect to the system of FIG. 1. However, this method may additionally or alternatively be executed by any one system, or any combination of systems, including, but not limited to, those described herein. In these or other embodiments, one or more operations of the method 200 may be performed by one or more computing devices, such as that described in further detail below with respect to FIG. 4.

The method 200 includes, at block B202, a first system test being performed on a first processing element of an integrated processing system. The first system test may be based at least on a first local test controller (e.g., the first local controller 106 of FIG. 1) accessing a first test node (e.g., the first JTAG node 110 of FIG. 1) associated with the first processing element.

In these or other embodiments, the first processing element may be included in a first processing element cluster (e.g., the first processing element cluster 118 of FIG. 1), which may include one or more processing elements including the first processing element. In some embodiments, the first test node may be associated with and/or communicatively coupled to the first processing element cluster. The association of the first test node with the first processing element cluster and the first processing element being included in the first processing element cluster may accordingly be such that the first test node is associated with the first processing element cluster. Further, in some embodiments, the first system test may be performed with respect to the first processing element cluster, which may include the first processing element, such that the first system test being performed with respect to the first processing element cluster may include performing the first test with respect to the first processing element.

In some embodiments, the first system test may include a runtime in-system test. In some embodiments, the first system test may be performed based at least on test instructions that may direct the performance of the first system test. In some embodiments, the test instructions may be obtained from a memory device (e.g., the first memory device 108 of FIG. 1), which memory device may be associated with the first local test controller. In some embodiments, the test instructions may be associated with the first processing element cluster (e.g., the test instructions may be individually associated with one or more of the processing elements included in the first processing element cluster such as the first processing element). In some embodiments, the test instructions obtained from the first local test controller may be converted from a first format to a second format prior to the first system test, such as described in the present disclosure at least with respect to FIG. 1.

In some embodiments, in response to the first local test controller being in an active state, a first data selector (e.g., the first data selector 114 of FIG. 1) may select a first selector mode, which may allow communication of data between the first local test controller and the first processing element cluster. Alternatively, or additionally, in response to the first local test controller being in an inactive state, the first data selector may select a second selector mode, which may allow communication of data between a data bus (e.g., the data bus 104 of FIG. 1) and the first processing element cluster.

In some embodiments, one or more registers (e.g., the first registers 116 of FIG. 1) associated with the first test node may be configured into a first register mode in response to the first test node receiving a first signal from the first local test controller associated with the first local test controller being in an active state. Alternatively, or additionally, the registers associated with the first test node may be configured into a second register mode in response to the first test node receiving a second signal from the first local test controller associated with the first local test controller being in an inactive state. The second register mode may be associated with an operation other than the first system test.

At block B204, a second system test is performed on a second processing element of the integrated processing system. The second system test may be based at least on a second local test controller (e.g., the second local controller 120 of FIG. 1) accessing a second test node (e.g., the second JTAG node 124 of FIG. 1) associated with a second processing element. In some embodiments, the second system test may be performed independently from the first system test on the first processing element. For example, in some embodiments, the first system test may occur during a first time period and the second system test may occur during a second time period, where the second time period may at least partially overlap the first time period. In another example, the second processing element may be configured to perform an operation (e.g., not runtime in-system testing) during the performance of the first system test with respect to the first processing element, where the performance of the operation and the first system test do not affect one another. In these or other embodiments, the performance of the first system test by the first local test controller may not cause any change to or otherwise affect the performance of the second system test by the second local test controller, and vice versa. Further, the performance of the first system test by the first local test controller with respect to the first processing element may not cause any change to or otherwise affect performance of other operations associated with the second test node and/or the second processing element, and vice versa. In some embodiments, the second processing element may be part of the integrated processing system.

In these or other embodiments, the second processing element may be part of a second processing element cluster (e.g., the second processing element cluster 132 of FIG. 1) of one or more processing elements and the second test node may be associated with the second processing element cluster. The association of the second test node with the second processing element cluster and the second processing element being included in the second processing element cluster may accordingly be such that the second test node is associated with the second processing element. Further, in some embodiments, the second system test may be performed with respect to the second processing element cluster, which may include the second processing element, such that the second system test being performed with respect to the second processing element cluster may include performing the second test with respect to the second processing element.

Modifications, additions, or omissions may be made to the method 200 without departing from the scope of the present disclosure. For example, in some embodiments, the method 200 may include less local test controllers than the number of processing elements. In some embodiments, a difference in the number of local test controllers relative to the number of processing elements may be in response to the method 200 not performing system testing on every processing element in a processing system. For example, in a processing system that includes three processing elements where system testing may be performed on two of the three processing elements, two local test controllers may be included in the processing system to perform the system testing on the two processing elements and not on the third processing element.

Although illustrated as discrete blocks, various blocks of the method 200 may be divided into additional blocks, combined into fewer blocks, or eliminated, depending on the desired implementation.

Example Autonomous Vehicle

Figure 3A:
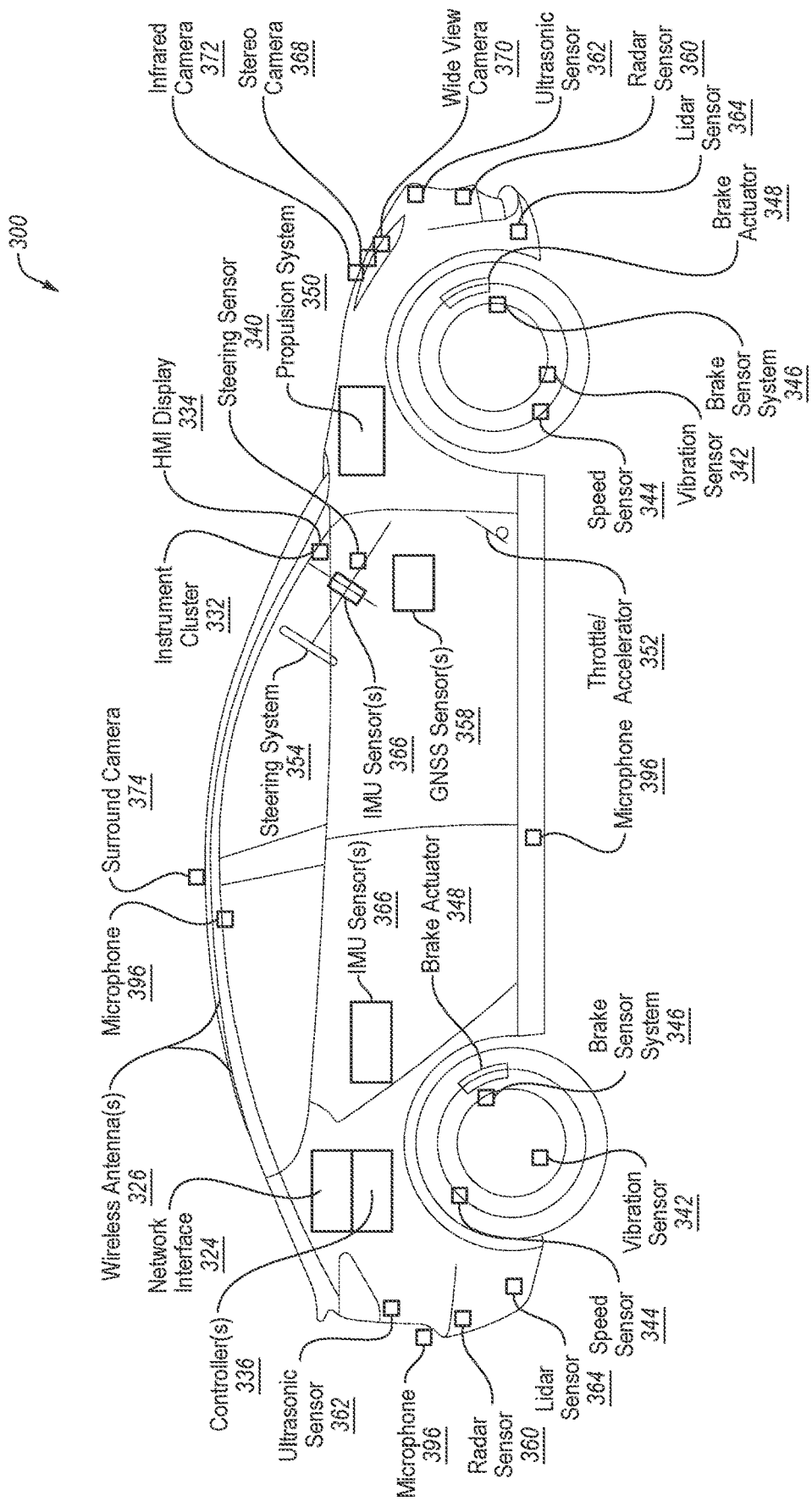
FIG. 3A is an illustration of an example autonomous vehicle, in accordance with some embodiments of the present disclosure.

FIG. 3A is an illustration of an example autonomous vehicle 300, in accordance with some embodiments of the present disclosure. The autonomous vehicle 300 (alternatively referred to herein as the "vehicle 300") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 300 may be capable of functionality in accordance with one or more of Level 3-Level 5 of the autonomous driving levels. For example, the vehicle 300 may be capable of conditional automation (Level 3), high automation (Level 4), and/or full automation (Level 5), depending on the embodiment.

The vehicle 300 may include components such as a chassis, a vehicle body, wheels (e.g., 2, 4, 6, 8, 18, etc.), tires, axles, and other components of a vehicle. The vehicle 300 may include a propulsion system 350, such as an internal combustion engine, hybrid electric power plant, an all-electric engine, and/or another propulsion system type. The propulsion system 350 may be connected to a drive train of the vehicle 300, which may include a transmission, to enable the propulsion of the vehicle 300. The propulsion system 350 may be controlled in response to receiving signals from the throttle/accelerator 352.

A steering system 354, which may include a steering wheel, may be used to steer the vehicle 300 (e.g., along a desired path or route) when the propulsion system 350 is operating (e.g., when the vehicle is in motion). The steering system 354 may receive signals from a steering actuator 356. The steering wheel may be optional for full automation (Level 5) functionality.

The brake sensor system 346 may be used to operate the vehicle brakes in response to receiving signals from the brake actuators 348 and/or brake sensors.

Controller(s) 336, which may include one or more CPU(s), system on chips (SoCs) 304 (FIG. 3C) and/or GPU(s), may provide signals (e.g., representative of commands) to one or more components and/or systems of the vehicle 300. For example, the controller(s) may send signals to operate the vehicle brakes via one or more brake actuators 348, to operate the steering system 354 via one or more steering actuators 356, and/or to operate the propulsion system 350 via one or more throttle/accelerators 352. The controller(s) 336 may include one or more onboard (e.g., integrated) computing devices (e.g., supercomputers) that process sensor signals, and output operation commands (e.g., signals representing commands) to enable autonomous driving and/or to assist a human driver in driving the vehicle 300. The controller(s) 336 may include a first controller 336 for autonomous driving functions, a second controller 336 for functional safety functions, a third controller 336 for artificial intelligence functionality (e.g., computer vision), a fourth controller 336 for infotainment functionality, a fifth controller 336 for redundancy in emergency conditions, and/or other controllers. In some examples, a single controller 336 may handle two or more of the above functionalities, two or more controllers 336 may handle a single functionality, and/or any combination thereof.

The controller(s) 336 may provide the signals for controlling one or more components and/or systems of the vehicle 300 in response to sensor data received from one or more sensors (e.g., sensor inputs). The sensor data may be received from, for example and without limitation, global navigation satellite systems sensor(s) 358 (e.g., Global Positioning System sensor(s)), RADAR sensor(s) 360, ultrasonic sensor(s) 362, LIDAR sensor(s) 364, inertial measurement unit (IMU) sensor(s) 366 (e.g., accelerometer(s), gyroscope(s), magnetic compass(es), magnetometer(s), etc.), microphone(s) 396, stereo camera(s) 368, wide-view camera(s) 370 (e.g., fisheye cameras), infrared camera(s) 372, surround camera(s) 374 (e.g., 360 degree cameras), long-range and/or mid-range camera(s) 398, speed sensor(s) 344 (e.g., for measuring the speed of the vehicle 300), vibration sensor(s) 342, steering sensor(s) 340, brake sensor(s) 346 (e.g., as part of the brake sensor system 346), and/or other sensor types.

One or more of the controller(s) 336 may receive inputs (e.g., represented by input data) from an instrument cluster 332 of the vehicle 300 and provide outputs (e.g., represented by output data, display data, etc.) via a human-machine interface (HMI) display 334, an audible annunciator, a loudspeaker, and/or via other components of the vehicle 300. The outputs may include information such as vehicle velocity, speed, time, map data (e.g., the HD map 322 of FIG. 3C), location data (e.g., the location of the vehicle 300, such as on a map), direction, location of other vehicles (e.g., an occupancy grid), information about objects and status of objects as perceived by the controller(s) 336, etc. For example, the HMI display 334 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 300 further includes a network interface 324, which may use one or more wireless antenna(s) 326 and/or modem(s) to communicate over one or more networks. For example, the network interface 324 may be capable of communication over LTE, WCDMA, UMTS, GSM, CDMA2000, etc. The wireless antenna(s) 326 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 3B:
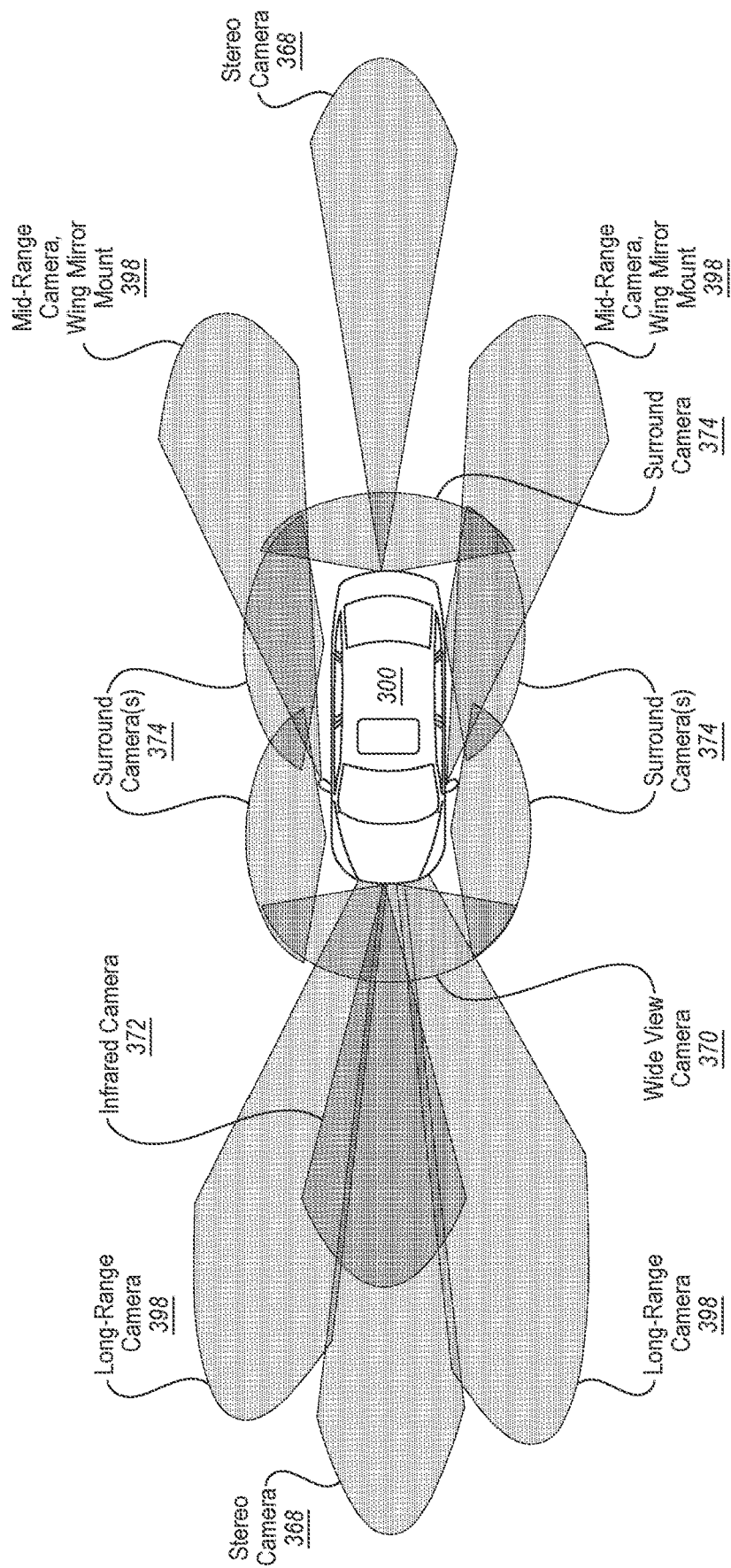
FIG. 3B is an example of camera locations and fields of view for the example autonomous vehicle of FIG. 3A, in accordance with some embodiments of the present disclosure.

FIG. 3B is an example of camera locations and fields of view for the example autonomous vehicle 300 of FIG. 3A, in accordance with some embodiments of the present disclosure. The cameras and respective fields of view are one example embodiment and are not intended to be limiting. For example, additional and/or alternative cameras may be included and/or the cameras may be located at different locations on the vehicle 300.

The camera types for the cameras may include, but are not limited to, digital cameras that may be adapted for use with the components and/or systems of the vehicle 300. The camera(s) may operate at automotive safety integrity level (ASIL) B and/or at another ASIL. The camera types may be capable of any image capture rate, such as 60 frames per second (fps), 320 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RB GC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 300 (e.g., front-facing cameras) may be used for surround view, to help identify forward-facing paths and obstacles, as well aid in, with the help of one or more controllers 336 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 370 that may be used to perceive objects coming into view from the periphery (e.g., pedestrians, crossing traffic or bicycles). Although only one wide-view camera is illustrated in FIG. 3B, there may any number of wide-view cameras 370 on the vehicle 300. In addition, long-range camera(s) 398 (e.g., a long-view stereo camera pair) may be used for depth-based object detection, especially for objects for which a neural network has not yet been trained. The long-range camera(s) 398 may also be used for object detection and classification, as well as basic object tracking.

One or more stereo cameras 368 may also be included in a front-facing configuration. The stereo camera(s) 368 may include an integrated control unit comprising a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 368 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 368 may be used in addition to, or alternatively from, those described herein.

Cameras with a field of view that includes portions of the environment to the side of the vehicle 300 (e.g., side-view cameras) may be used for surround view, providing information used to create and update the occupancy grid, as well as to generate side impact collision warnings. For example, surround camera(s) 374 (e.g., four surround cameras 374 as illustrated in FIG. 3B) may be positioned around the vehicle 300. The surround camera(s) 374 may include wide-view camera(s) 370, fisheye camera(s), 360-degree camera(s), and/or the like. For example, four fisheye cameras may be positioned on the vehicle's front, rear, and sides. In an alternative arrangement, the vehicle may use three surround camera(s) 374 (e.g., left, right, and rear), and may leverage one or more other camera(s) (e.g., a forward-facing camera) as a fourth surround-view camera.

Cameras with a field of view that include portions of the environment to the rear of the vehicle 300 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 398, stereo camera(s) 368), infrared camera(s) 372, etc.), as described herein.

Figure 3C:
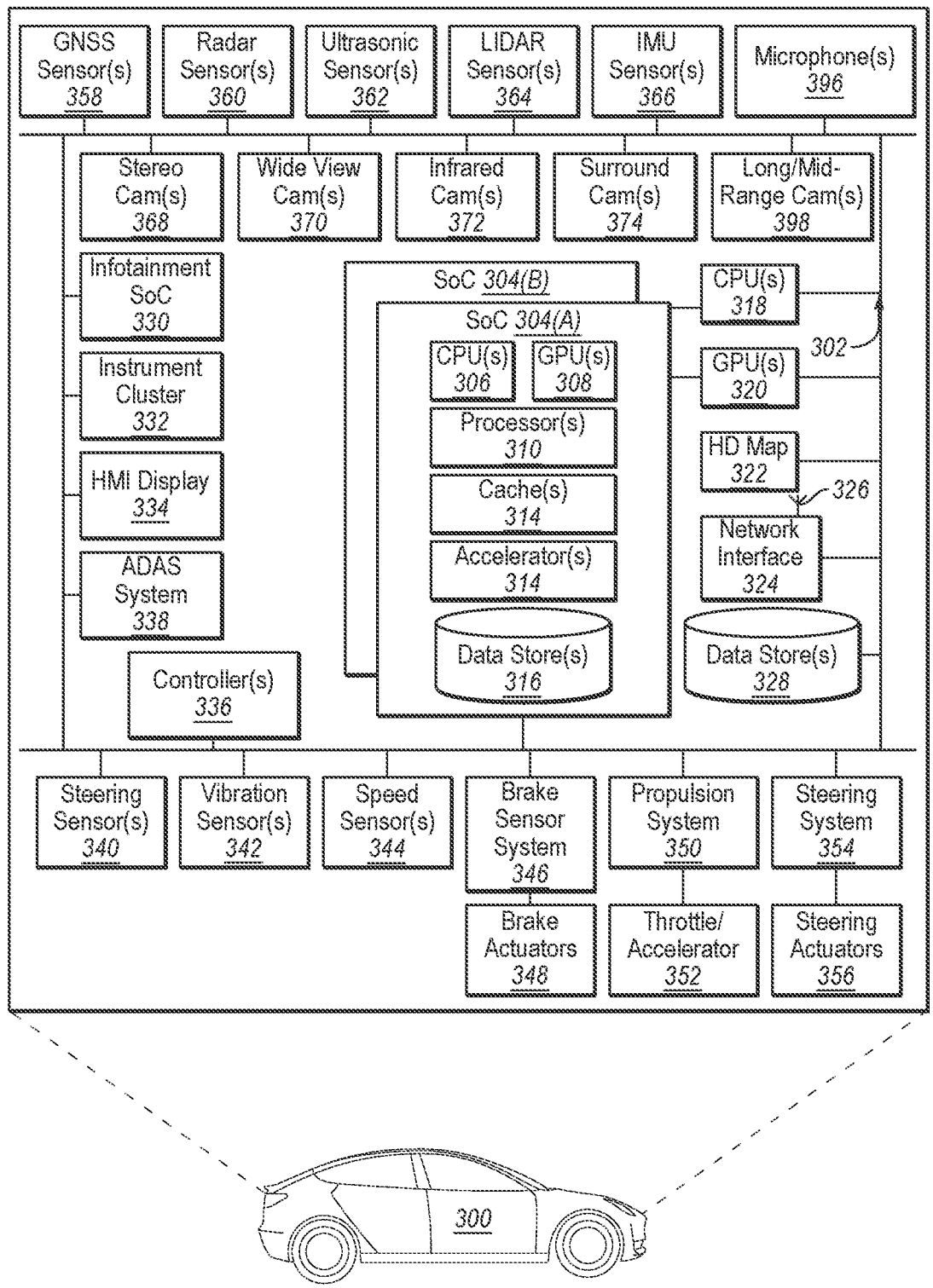
FIG. 3C is a block diagram of an example system architecture for the example autonomous vehicle of FIG. 3A, in accordance with some embodiments of the present disclosure.

FIG. 3C is a block diagram of an example system architecture for the example autonomous vehicle 300 of FIG. 3A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 300 in FIG. 3C is illustrated as being connected via bus 302. The bus 302 may include a Controller Area Network (CAN) data interface (alternatively referred to herein as a "CAN bus"). A CAN may be a network inside the vehicle 300 used to aid in control of various features and functionality of the vehicle 300, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 302 is described herein as being a CAN bus, this is not intended to be limiting. For example, in addition to, or alternatively from, the CAN bus, FlexRay and/or Ethernet may be used. Additionally, although a single line is used to represent the bus 302, this is not intended to be limiting. For example, there may be any number of busses 302, which may include one or more CAN busses, one or more FlexRay busses, one or more Ethernet busses, and/or one or more other types of busses using a different protocol. In some examples, two or more busses 302 may be used to perform different functions, and/or may be used for redundancy. For example, a first bus 302 may be used for collision avoidance functionality and a second bus 302 may be used for actuation control. In any example, each bus 302 may communicate with any of the components of the vehicle 300, and two or more busses 302 may communicate with the same components. In some examples, each SoC 304, each controller 336, and/or each computer within the vehicle may have access to the same input data (e.g., inputs from sensors of the vehicle 300), and may be connected to a common bus, such the CAN bus.

The vehicle 300 may include one or more controller(s) 336, such as those described herein with respect to FIG. 3A. The controller(s) 336 may be used for a variety of functions. The controller(s) 336 may be coupled to any of the various other components and systems of the vehicle 300 and may be used for control of the vehicle 300, artificial intelligence of the vehicle 300, infotainment for the vehicle 300, and/or the like.

The vehicle 300 may include a system(s) on a chip (SoC) 304. The SoC 304 may include CPU(s) 306, GPU(s) 308, processor(s) 310, cache(s) 312, accelerator(s) 314, data store(s) 316, and/or other components and features not illustrated. The SoC(s) 304 may be used to control the vehicle 300 in a variety of platforms and systems. For example, the SoC(s) 304 may be combined in a system (e.g., the system of the vehicle 300) with an HD map 322 which may obtain map refreshes and/or updates via a network interface 324 from one or more servers (e.g., server(s) 378 of FIG. 3D).

The CPU(s) 306 may include a CPU cluster or CPU complex (alternatively referred to herein as a "CCPLEX"). The CPU(s) 306 may include multiple cores and/or L2 caches. For example, in some embodiments, the CPU(s) 306 may include eight cores in a coherent multi-processor configuration. In some embodiments, the CPU(s) 306 may include four dual-core clusters where each cluster has a dedicated L2 cache (e.g., a 2 MB L2 cache). The CPU(s) 306 (e.g., the CCPLEX) may be configured to support simultaneous cluster operation enabling any combination of the clusters of the CPU(s) 306 to be active at any given time.

The CPU(s) 306 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 306 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 308 may include an integrated GPU (alternatively referred to herein as an "iGPU"). The GPU(s) 308 may be programmable and may be efficient for parallel workloads. The GPU(s) 308, in some examples, may use an enhanced tensor instruction set. The GPU(s) 308 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 308 may include at least eight streaming microprocessors. The GPU(s) 308 may use computer-based application programming interface(s) (API(s)). In addition, the GPU(s) 308 may use one or more parallel computing platforms and/or programming models (e.g., NVIDIA's CUDA).

The GPU(s) 308 may be power-optimized for best performance in automotive and embedded use cases. For example, the GPU(s) 308 may be fabricated on a Fin field-effect transistor (FinFET). However, this is not intended to be limiting, and the GPU(s) 308 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 308 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 308 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 308 to access the CPU(s) 306 page tables directly. In such examples, when the GPU(s) 308 memory management unit (MMU) experiences a miss, an address translation request may be transmitted to the CPU(s) 306. In response, the CPU(s) 306 may look in its page tables for the virtual-to-physical mapping for the address and transmits the translation back to the GPU(s) 308. As such, unified memory technology may allow a single unified virtual address space for memory of both the CPU(s) 306 and the GPU(s) 308, thereby simplifying the GPU(s) 308 programming and porting of applications to the GPU(s) 308.

In addition, the GPU(s) 308 may include an access counter that may keep track of the frequency of access of the GPU(s) 308 to memory of other processors. The access counter may help ensure that memory pages are moved to the physical memory of the processor that is accessing the pages most frequently.

The SoC(s) 304 may include any number of cache(s) 312, including those described herein. For example, the cache(s) 312 may include an L3 cache that is available to both the CPU(s) 306 and the GPU(s) 308 (e.g., that is connected to both the CPU(s) 306 and the GPU(s) 308). The cache(s) 312 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 304 may include an arithmetic logic unit(s) (ALU(s)) which may be leveraged in performing processing with respect to any of the variety of tasks or operations of the vehicle 300—such as processing DNNs. In addition, the SoC(s) 304 may include a floating point unit(s) (FPU(s))—or other math coprocessor or numeric coprocessor types—for performing mathematical operations within the system. For example, the SoC(s) 304 may include one or more FPUs integrated as execution units within a CPU(s) 306 and/or GPU(s) 308.

The SoC(s) 304 may include one or more accelerators 314 (e.g., hardware accelerators, software accelerators, or a combination thereof). For example, the SoC(s) 304 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 308 and to off-load some of the tasks of the GPU(s) 308 (e.g., to free up more cycles of the GPU(s) 308 for performing other tasks). As an example, the accelerator(s) 314 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 314 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 308, and by using an inference accelerator, for example, a designer may target either the DLA(s) or the GPU(s) 308 for any function. For example, the designer may focus processing of CNNs and floating point operations on the DLA(s) and leave other functions to the GPU(s) 308 and/or other accelerator(s) 314.

The accelerator(s) 314 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 306. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 314 (e.g., the hardware acceleration cluster) may include a computer vision network on-chip and SRAM, for providing a high-bandwidth, low latency SRAM for the accelerator(s) 314. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 304 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 314 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-3 autonomous driving require motion estimation/stereo matching on-the-fly (e.g., structure from motion, pedestrian recognition, lane detection, etc.).

The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 366 output that correlates with the vehicle 300 orientation, distance, 3D location estimates of the object obtained from the neural network and/or other sensors (e.g., LIDAR sensor(s) 364 or RADAR sensor(s) 360), among others.

The SoC(s) 304 may include data store(s) 316 (e.g., memory). The data store(s) 316 may be on-chip memory of the SoC(s) 304, which may store neural networks to be executed on the GPU and/or the DLA. In some examples, the data store(s) 316 may be large enough in capacity to store multiple instances of neural networks for redundancy and safety. The data store(s) 316 may comprise L2 or L3 cache(s) 312. Reference to the data store(s) 316 may include reference to the memory associated with the PVA, DLA, and/or other accelerator(s) 314, as described herein.

The SoC(s) 304 may include one or more processor(s) 310 (e.g., embedded processors). The processor(s) 310 may include a boot and power management processor that may be a dedicated processor and subsystem to handle boot power and management functions and related security enforcement. The boot and power management processor may be a part of the SoC(s) 304 boot sequence and may provide runtime power management services. The boot power and management processor may provide clock and voltage programming, assistance in system low power state transitions, management of SoC(s) 304 thermals and temperature sensors, and/or management of the SoC(s) 304 power states. Each temperature sensor may be implemented as a ring-oscillator whose output frequency is proportional to temperature, and the SoC(s) 304 may use the ring-oscillators to detect temperatures of the CPU(s) 306, GPU(s) 308, and/or accelerator(s) 314. If temperatures are determined to exceed a threshold, the boot and power management processor may enter a temperature fault routine and put the SoC(s) 304 into a lower power state and/or put the vehicle 300 into a chauffeur to safe-stop mode (e.g., bring the vehicle 300 to a safe stop).

The processor(s) 310 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 310 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 310 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 310 may further include a real-time camera engine that may include a dedicated processor subsystem for handling real-time camera management.

The processor(s) 310 may further include a high dynamic range signal processor that may include an image signal processor that is a hardware engine that is part of the camera processing pipeline.

The processor(s) 310 may include a video image compositor that may be a processing block (e.g., implemented on a microprocessor) that implements video post-processing functions needed by a video playback application to produce the final image for the player window. The video image compositor may perform lens distortion correction on wide-view camera(s) 370, surround camera(s) 374, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 308 is not required to continuously render new surfaces. Even when the GPU(s) 308 is powered on and actively performing 3D rendering, the video image compositor may be used to offload the GPU(s) 308 to improve performance and responsiveness.

The SoC(s) 304 may further include a mobile industry processor interface (MIPI) camera serial interface for receiving video and input from cameras, a high-speed interface, and/or a video input block that may be used for camera and related pixel input functions. The SoC(s) 304 may further include an input/output controller(s) that may be controlled by software and may be used for receiving I/O signals that are uncommitted to a specific role.

The SoC(s) 304 may further include a broad range of peripheral interfaces to enable communication with peripherals, audio codecs, power management, and/or other devices. The SoC(s) 304 may be used to process data from cameras (e.g., connected over Gigabit Multimedia Serial Link and Ethernet), sensors (e.g., LIDAR sensor(s) 364, RADAR sensor(s) 360, etc. that may be connected over Ethernet), data from bus 302 (e.g., speed of vehicle 300, steering wheel position, etc.), data from GNSS sensor(s) 358 (e.g., connected over Ethernet or CAN bus). The SoC(s) 304 may further include dedicated high-performance mass storage controllers that may include their own DMA engines, and that may be used to free the CPU(s) 306 from routine data management tasks.

The SoC(s) 304 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 304 may be faster, more reliable, and even more energy-efficient and space-efficient than conventional systems. For example, the accelerator(s) 314, when combined with the CPU(s) 306, the GPU(s) 308, and the data store(s) 316, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 320) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 308.

In some examples, a CNN for facial recognition and vehicle owner identification may use data from camera sensors to identify the presence of an authorized driver and/or owner of the vehicle 300. The always-on sensor processing engine may be used to unlock the vehicle when the owner approaches the driver door and turn on the lights, and, in security mode, to disable the vehicle when the owner leaves the vehicle. In this way, the SoC(s) 304 provide for security against theft and/or carjacking.

In another example, a CNN for emergency vehicle detection and identification may use data from microphones 396 to detect and identify emergency vehicle sirens. In contrast to conventional systems, which use general classifiers to detect sirens and manually extract features, the SoC(s) 304 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 358. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 362, until the emergency vehicle(s) passes.

The vehicle may include a CPU(s) 318 (e.g., discrete CPU(s), or dCPU(s)), that may be coupled to the SoC(s) 304 via a high-speed interconnect (e.g., PCIe). The CPU(s) 318 may include an X86 processor, for example. The CPU(s) 318 may be used to perform any of a variety of functions, including arbitrating potentially inconsistent results between ADAS sensors and the SoC(s) 304, and/or monitoring the status and health of the controller(s) 336 and/or infotainment SoC 330, for example.

The vehicle 300 may include a GPU(s) 320 (e.g., discrete GPU(s), or dGPU(s)), that may be coupled to the SoC(s) 304 via a high-speed interconnect (e.g., NVIDIA's NVLINK). The GPU(s) 320 may provide additional artificial intelligence functionality, such as by executing redundant and/or different neural networks, and may be used to train and/or update neural networks based on input (e.g., sensor data) from sensors of the vehicle 300.

The vehicle 300 may further include the network interface 324 which may include one or more wireless antennas 326 (e.g., one or more wireless antennas for different communication protocols, such as a cellular antenna, a Bluetooth antenna, etc.). The network interface 324 may be used to enable wireless connectivity over the Internet with the cloud (e.g., with the server(s) 378 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 300 information about vehicles in proximity to the vehicle 300 (e.g., vehicles in front of, on the side of, and/or behind the vehicle 300). This functionality may be part of a cooperative adaptive cruise control functionality of the vehicle 300.

The network interface 324 may include an SoC that provides modulation and demodulation functionality and enables the controller(s) 336 to communicate over wireless networks. The network interface 324 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 300 may further include data store(s) 328, which may include off-chip (e.g., off the SoC(s) 304) storage. The data store(s) 328 may include one or more storage elements including RAM, SRAM, DRAM, VRAM, Flash, hard disks, and/or other components and/or devices that may store at least one bit of data.

The vehicle 300 may further include GNSS sensor(s) 385 (e.g., GPS and/or assisted GPS sensors), to assist in mapping, perception, occupancy grid generation, and/or path planning functions. Any number of GNSS sensor(s) 358 may be used, including, for example and without limitation, a GPS using a USB connector with an Ethernet to serial (RS-232) bridge.

The vehicle 300 may further include RADAR sensor(s) 360. The RADAR sensor(s) 360 may be used by the vehicle 300 for long-range vehicle detection, even in darkness and/or severe weather conditions. RADAR functional safety levels may be ASIL B. The RADAR sensor(s) 360 may use the CAN and/or the bus 302 (e.g., to transmit data generated by the RADAR sensor(s) 360) for control and to access object tracking data, with access to Ethernet to access raw data, in some examples. A wide variety of RADAR sensor types may be used. For example, and without limitation, the RADAR sensor(s) 360 may be suitable for front, rear, and side RADAR use. In some example, Pulse Doppler RADAR sensor(s) are used.

The RADAR sensor(s) 360 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 360 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 300 at higher speeds with minimal interference from traffic in adjacent lanes. The other two antennae may expand the field of view, making it possible to quickly detect vehicles entering or leaving the vehicle's 300 lane.

Mid-range RADAR systems may include, as an example, a range of up to 560 m (front) or 80 m (rear), and a field of view of up to 42 degrees (front) or 350 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 300 may further include ultrasonic sensor(s) 362. The ultrasonic sensor(s) 362, which may be positioned at the front, back, and/or the sides of the vehicle 300, may be used for park assist and/or to create and update an occupancy grid. A wide variety of ultrasonic sensor(s) 362 may be used, and different ultrasonic sensor(s) 362 may be used for different ranges of detection (e.g., 2.5 m, 4 m). The ultrasonic sensor(s) 362 may operate at functional safety levels of ASIL B.

The vehicle 300 may include LIDAR sensor(s) 364. The LIDAR sensor(s) 364 may be used for object and pedestrian detection, emergency braking, collision avoidance, and/or other functions. The LIDAR sensor(s) 364 may be functional safety level ASIL B. In some examples, the vehicle 300 may include multiple LIDAR sensors 364 (e.g., two, four, six, etc.) that may use Ethernet (e.g., to provide data to a Gigabit Ethernet switch).

In some examples, the LIDAR sensor(s) 364 may be capable of providing a list of objects and their distances for a 360-degree field of view. Commercially available LIDAR sensor(s) 364 may have an advertised range of approximately 500 m, with an accuracy of 2 cm-3 cm, and with support for a 500 Mbps Ethernet connection, for example. In some examples, one or more non-protruding LIDAR sensors 364 may be used. In such examples, the LIDAR sensor(s) 364 may be implemented as a small device that may be embedded into the front, rear, sides, and/or corners of the vehicle 300. The LIDAR sensor(s) 364, in such examples, may provide up to a 520-degree horizontal and 35-degree vertical field-of-view, with a 200 m range even for low-reflectivity objects. Front-mounted LIDAR sensor(s) 364 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 300. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 364 may be less susceptible to motion blur, vibration, and/or shock.

The vehicle may further include IMU sensor(s) 366. The IMU sensor(s) 366 may be located at a center of the rear axle of the vehicle 300, in some examples. The IMU sensor(s) 366 may include, for example and without limitation, an accelerometer(s), a magnetometer(s), a gyroscope(s), a magnetic compass(es), and/or other sensor types. In some examples, such as in six-axis applications, the IMU sensor(s) 366 may include accelerometers and gyroscopes, while in nine-axis applications, the IMU sensor(s) 366 may include accelerometers, gyroscopes, and magnetometers.

In some embodiments, the IMU sensor(s) 366 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 366 may enable the vehicle 300 to estimate heading without requiring input from a magnetic sensor by directly observing and correlating the changes in velocity from GPS to the IMU sensor(s) 366. In some examples, the IMU sensor(s) 366 and the GNSS sensor(s) 358 may be combined in a single integrated unit.

The vehicle may include microphone(s) 396 placed in and/or around the vehicle 300. The microphone(s) 396 may be used for emergency vehicle detection and identification, among other things.

The vehicle may further include any number of camera types, including stereo camera(s) 368, wide-view camera(s) 370, infrared camera(s) 372, surround camera(s) 374, long-range and/or mid-range camera(s) 398, and/or other camera types. The cameras may be used to capture image data around an entire periphery of the vehicle 300. The types of cameras used depends on the embodiments and requirements for the vehicle 300, and any combination of camera types may be used to provide the necessary coverage around the vehicle 300. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 3A and FIG. 3B.

The vehicle 300 may further include vibration sensor(s) 342. The vibration sensor(s) 342 may measure vibrations of components of the vehicle, such as the axle(s). For example, changes in vibrations may indicate a change in road surfaces. In another example, when two or more vibration sensors 342 are used, the differences between the vibrations may be used to determine friction or slippage of the road surface (e.g., when the difference in vibration is between a power-driven axle and a freely rotating axle).

The vehicle 300 may include an ADAS system 338. The ADAS system 338 may include an SoC, in some examples. The ADAS system 338 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 360, LIDAR sensor(s) 364, and/or a camera(s). The ACC systems may include longitudinal ACC and/or lateral ACC. Longitudinal ACC monitors and controls the distance to the vehicle immediately ahead of the vehicle 300 and automatically adjusts the vehicle speed to maintain a safe distance from vehicles ahead. Lateral ACC performs distance keeping, and advises the vehicle 300 to change lanes when necessary. Lateral ACC is related to other ADAS applications such as LC and CWS.

CACC uses information from other vehicles that may be received via the network interface 324 and/or the wireless antenna(s) 326 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 300), while the I2V communication concept provides information about traffic farther ahead. CACC systems may include either or both I2V and V2V information sources. Given the information of the vehicles ahead of the vehicle 300, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 360, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 360, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 300 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 300 if the vehicle 300 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 360, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 300 is backing up. Some RCTW systems include AEB to ensure that the vehicle brakes are applied to avoid a crash. RCTW systems may use one or more rear-facing RADAR sensor(s) 360, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 300, the vehicle 300 itself must, in the case of conflicting results, decide whether to heed the result from a primary computer or a secondary computer (e.g., a first controller 336 or a second controller 336). For example, in some embodiments, the ADAS system 338 may be a backup and/or secondary computer for providing perception information to a backup computer rationality module. The backup computer rationality monitor may run a redundant diverse software on hardware components to detect faults in perception and dynamic driving tasks. Outputs from the ADAS system 338 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 304.

In other examples, ADAS system 338 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 338 may be fed into the primary computer's perception block and/or the primary computer's dynamic driving task block. For example, if the ADAS system 338 indicates a forward crash warning due to an object immediately ahead, the perception block may use this information when identifying objects. In other examples, the secondary computer may have its own neural network that is trained and thus reduces the risk of false positives, as described herein.

The vehicle 300 may further include the infotainment SoC 330 (e.g., an in-vehicle infotainment system (IVI)). Although illustrated and described as an SoC, the infotainment system may not be a SoC, and may include two or more discrete components. The infotainment SoC 330 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 300. For example, the infotainment SoC 330 may include radios, disk players, navigation systems, video players, USB and Bluetooth connectivity, carputers, in-car entertainment, Wi-Fi, steering wheel audio controls, hands-free voice control, a heads-up display (HUD), an HMI display 334, a telematics device, a control panel (e.g., for controlling and/or interacting with various components, features, and/or systems), and/or other components. The infotainment SoC 330 may further be used to provide information (e.g., visual and/or audible) to a user(s) of the vehicle, such as information from the ADAS system 338, autonomous driving information such as planned vehicle maneuvers, trajectories, surrounding environment information (e.g., intersection information, vehicle information, road information, etc.), and/or other information.

The infotainment SoC 330 may include GPU functionality. The infotainment SoC 330 may communicate over the bus 302 (e.g., CAN bus, Ethernet, etc.) with other devices, systems, and/or components of the vehicle 300. In some examples, the infotainment SoC 330 may be coupled to a supervisory MCU such that the GPU of the infotainment system may perform some self-driving functions in the event that the primary controller(s) 336 (e.g., the primary and/or backup computers of the vehicle 300) fail. In such an example, the infotainment SoC 330 may put the vehicle 300 into a chauffeur to safe-stop mode, as described herein.

The vehicle 300 may further include an instrument cluster 332 (e.g., a digital dash, an electronic instrument cluster, a digital instrument panel, etc.). The instrument cluster 332 may include a controller and/or supercomputer (e.g., a discrete controller or supercomputer). The instrument cluster 332 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 330 and the instrument cluster 332. In other words, the instrument cluster 332 may be included as part of the infotainment SoC 330, or vice versa.

Figure 3D:
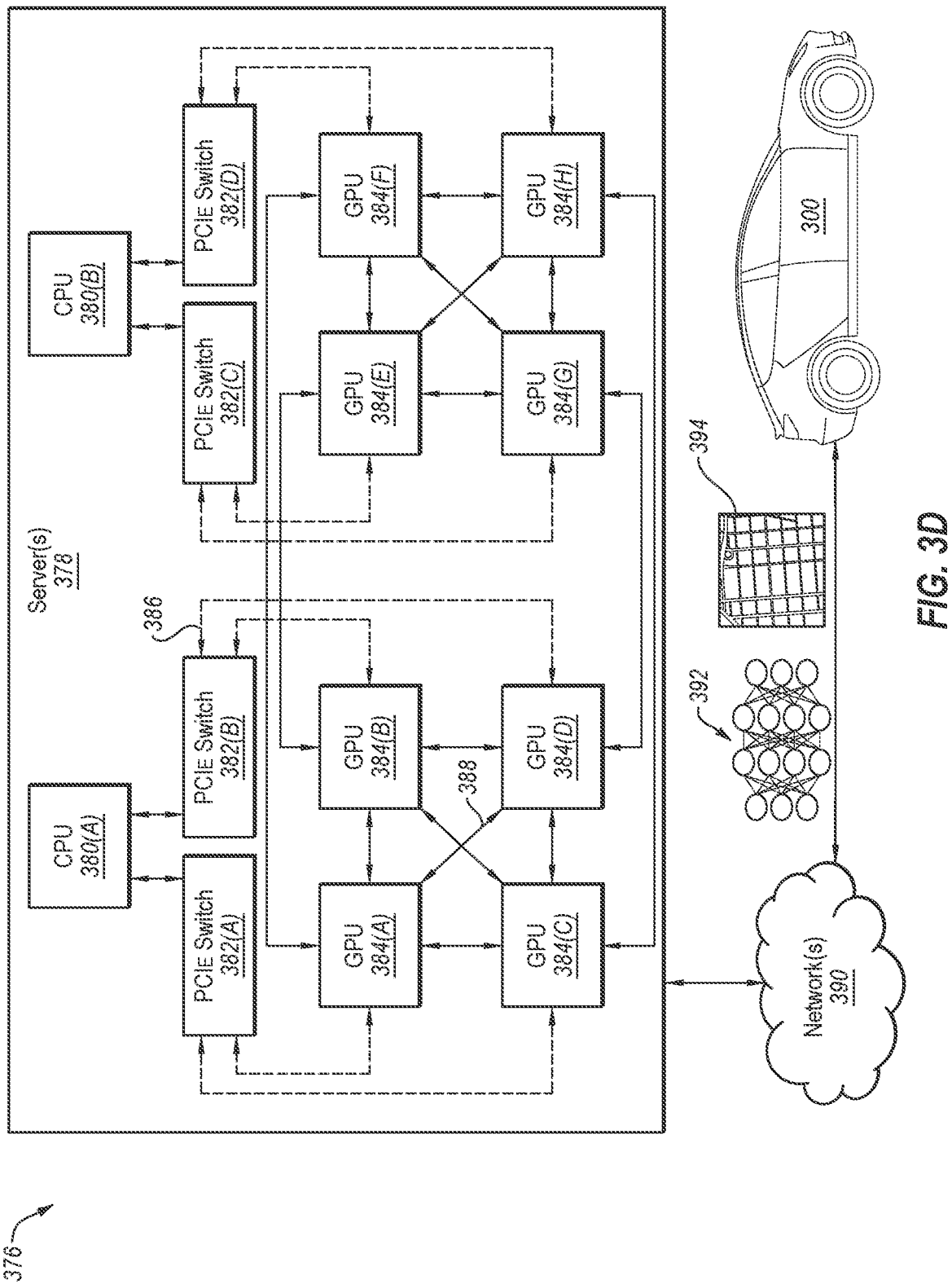
FIG. 3D is a system diagram for communication between cloud-based server(s) and the example autonomous vehicle of FIG. 3A, in accordance with some embodiments of the present disclosure.

FIG. 3D is a system diagram for communication between cloud-based server(s) and the example autonomous vehicle 300 of FIG. 3A, in accordance with some embodiments of the present disclosure. The system 376 may include server(s) 378, network(s) 390, and vehicles, including the vehicle 300. The server(s) 378 may include a plurality of GPUs 384(A)-384(H) (collectively referred to herein as GPUs 384), PCIe switches 382(A)-382(H) (collectively referred to herein as PCIe switches 382), and/or CPUs 380(A)-380(B) (collectively referred to herein as CPUs 380). The GPUs 384, the CPUs 380, and the PCIe switches may be interconnected with high-speed interconnects such as, for example and without limitation, NVLink interfaces 388 developed by NVIDIA and/or PCIe connections 386. In some examples, the GPUs 384 are connected via NVLink and/or NVSwitch SoC and the GPUs 384 and the PCIe switches 382 are connected via PCIe interconnects. Although eight GPUs 384, two CPUs 380, and two PCIe switches are illustrated, this is not intended to be limiting. Depending on the embodiment, each of the server(s) 378 may include any number of GPUs 384, CPUs 380, and/or PCIe switches. For example, the server(s) 378 may each include eight, sixteen, thirty-two, and/or more GPUs 384.

The server(s) 378 may receive, over the network(s) 390 and from the vehicles, image data representative of images showing unexpected or changed road conditions, such as recently commenced roadwork. The server(s) 378 may transmit, over the network(s) 390 and to the vehicles, neural networks 392, updated neural networks 392, and/or map information 394, including information regarding traffic and road conditions. The updates to the map information 394 may include updates for the HD map 322, such as information regarding construction sites, potholes, detours, flooding, and/or other obstructions. In some examples, the neural networks 392, the updated neural networks 392, and/or the map information 394 may have resulted from new training and/or experiences represented in data received from any number of vehicles in the environment, and/or based on training performed at a datacenter (e.g., using the server(s) 378 and/or other servers).

The server(s) 378 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 390, and/or the machine learning models may be used by the server(s) 378 to remotely monitor the vehicles.

In some examples, the server(s) 378 may receive data from the vehicles and apply the data to up-to-date real-time neural networks for real-time intelligent inferencing. The server(s) 378 may include deep-learning supercomputers and/or dedicated AI computers powered by GPU(s) 384, such as a DGX and DGX Station machines developed by NVIDIA. However, in some examples, the server(s) 378 may include deep learning infrastructure that use only CPU-powered datacenters.

The deep-learning infrastructure of the server(s) 378 may be capable of fast, real-time inferencing, and may use that capability to evaluate and verify the health of the processors, software, and/or associated hardware in the vehicle 300. For example, the deep-learning infrastructure may receive periodic updates from the vehicle 300, such as a sequence of images and/or objects that the vehicle 300 has located in that sequence of images (e.g., via computer vision and/or other machine learning object classification techniques). The deep-learning infrastructure may run its own neural network to identify the objects and compare them with the objects identified by the vehicle 300 and, if the results do not match and the infrastructure concludes that the AI in the vehicle 300 is malfunctioning, the server(s) 378 may transmit a signal to the vehicle 300 instructing a fail-safe computer of the vehicle 300 to assume control, notify the passengers, and complete a safe parking maneuver.

For inferencing, the server(s) 378 may include the GPU(s) 384 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 4:
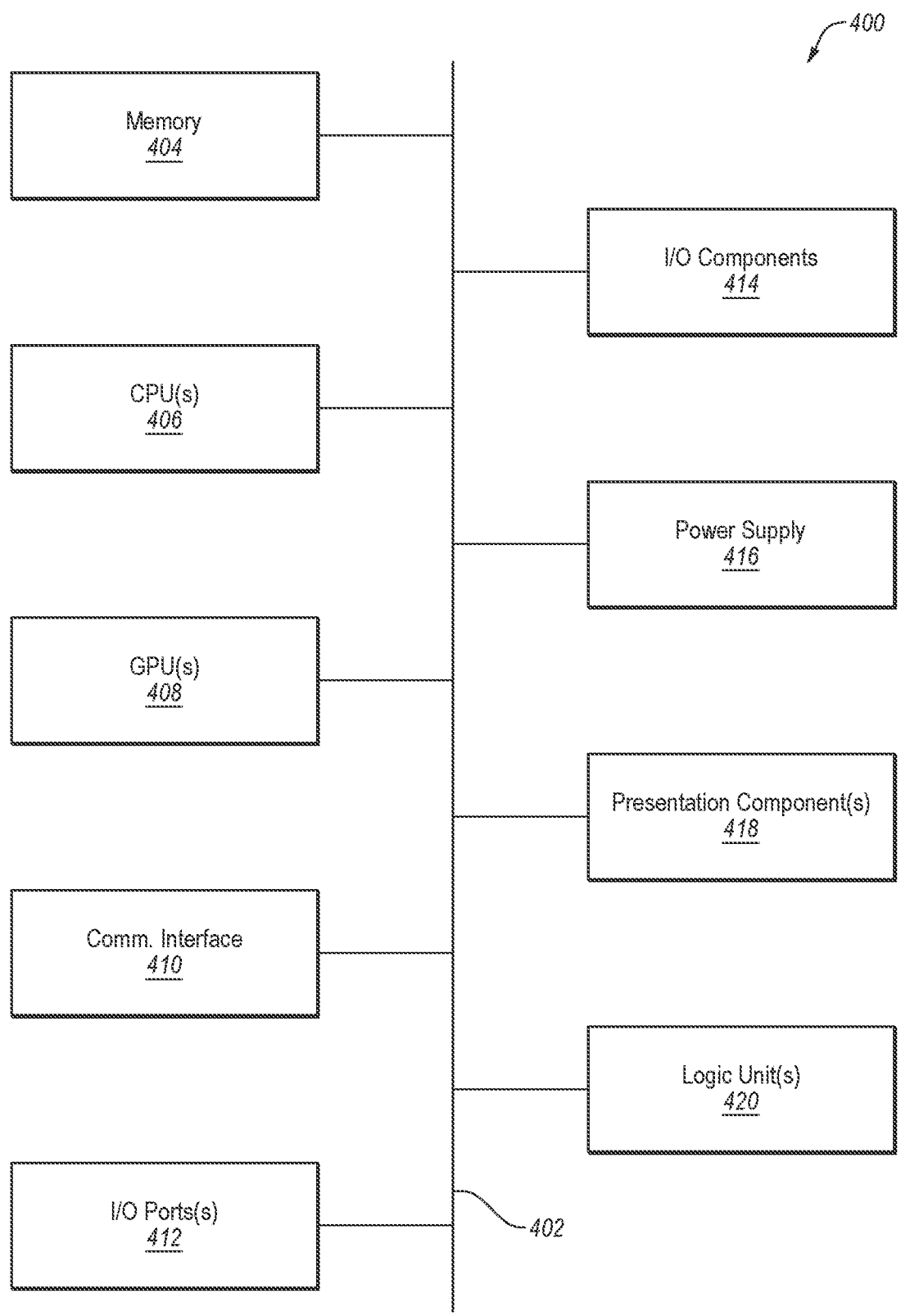
FIG. 4 is a block diagram of an example computing device suitable for use in implementing some embodiments of the present disclosure.

FIG. 4 is a block diagram of an example computing device(s) 400 suitable for use in implementing some embodiments of the present disclosure. Computing device 400 may include an interconnect system 402 that directly or indirectly couples the following devices: memory 404, one or more central processing units (CPUs) 406, one or more graphics processing units (GPUs) 408, a communication interface 410, I/O ports 412, input/output components 414, a power supply 416, one or more presentation components 418 (e.g., display(s)), and one or more logic units 420.

Although the various blocks of FIG. 4 are shown as connected via the interconnect system 402 with lines, this is not intended to be limiting and is for clarity only. For example, in some embodiments, a presentation component 418, such as a display device, may be considered an I/O component 414 (e.g., if the display is a touch screen). As another example, the CPUs 406 and/or GPUs 408 may include memory (e.g., the memory 404 may be representative of a storage device in addition to the memory of the GPUs 408, the CPUs 406, and/or other components). In other words, the computing device of FIG. 4 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 4.

The interconnect system 402 may represent one or more links or busses, such as an address bus, a data bus, a control bus, or a combination thereof. The interconnect system 402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 406 may be directly connected to the memory 404. Further, the CPU 406 may be directly connected to the GPU 408. Where there is direct, or point-to-point, connection between components, the interconnect system 402 may include a PCIe link to carry out the connection. In these examples, a PCI bus need not be included in the computing device 400.

The memory 404 may include any of a variety of computer-readable media. The computer-readable media may be any available media that may be accessed by the computing device 400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 406 may be configured to execute at least some of the computer-readable instructions to control one or more components of the computing device 400 to perform one or more of the methods and/or processes described herein. The CPU(s) 406 may each include one or more cores (e.g., one, two, four, eight, twenty-eight, seventy-two, etc.) that are capable of handling a multitude of software threads simultaneously. The CPU(s) 406 may include any type of processor, and may include different types of processors depending on the type of computing device 400 implemented (e.g., processors with fewer cores for mobile devices and processors with more cores for servers). For example, depending on the type of computing device 400, the processor may be an Advanced RISC Machines (ARM) processor implemented using Reduced Instruction Set Computing (RISC) or an x86 processor implemented using Complex Instruction Set Computing (CISC). The computing device 400 may include one or more CPUs 406 in addition to one or more microprocessors or supplementary co-processors, such as math co-processors.

In addition to or alternatively from the CPU(s) 406, the GPU(s) 408 may be configured to execute at least some of the computer-readable instructions to control one or more components of the computing device 400 to perform one or more of the methods and/or processes described herein. One or more of the GPU(s) 408 may be an integrated GPU (e.g., with one or more of the CPU(s) 406 and/or one or more of the GPU(s) 408 may be a discrete GPU. In embodiments, one or more of the GPU(s) 408 may be a coprocessor of one or more of the CPU(s) 406. The GPU(s) 408 may be used by the computing device 400 to render graphics (e.g., 3D graphics) or perform general purpose computations. For example, the GPU(s) 408 may be used for General-Purpose computing on GPUs (GPGPU). The GPU(s) 408 may include hundreds or thousands of cores that are capable of handling hundreds or thousands of software threads simultaneously. The GPU(s) 408 may generate pixel data for output images in response to rendering commands (e.g., rendering commands from the CPU(s) 406 received via a host interface). The GPU(s) 408 may include graphics memory, such as display memory, for storing pixel data or any other suitable data, such as GPGPU data. The display memory may be included as part of the memory 404. The GPU(s) 408 may include two or more GPUs operating in parallel (e.g., via a link). The link may directly connect the GPUs (e.g., using NVLINK) or may connect the GPUs through a switch (e.g., using NVSwitch). When combined together, each GPU 408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 406 and/or the GPU(s) 408, the logic unit(s) 420 may be configured to execute at least some of the computer-readable instructions to control one or more components of the computing device 400 to perform one or more of the methods and/or processes described herein. In embodiments, the CPU(s) 406, the GPU(s) 408, and/or the logic unit(s) 420 may discretely or jointly perform any combination of the methods, processes and/or portions thereof. One or more of the logic units 420 may be part of and/or integrated in one or more of the CPU(s) 406 and/or the GPU(s) 408 and/or one or more of the logic units 420 may be discrete components or otherwise external to the CPU(s) 406 and/or the GPU(s) 408. In embodiments, one or more of the logic units 420 may be a coprocessor of one or more of the CPU(s) 406 and/or one or more of the GPU(s) 408.

Examples of the logic unit(s) 420 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 410 may include one or more receivers, transmitters, and/or transceivers that enable the computing device 400 to communicate with other computing devices via an electronic communication network, including wired and/or wireless communications. The communication interface 410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 412 may enable the computing device 400 to be logically coupled to other devices including the I/O components 414, the presentation component(s) 418, and/or other components, some of which may be built into (e.g., integrated in) the computing device 400. Illustrative I/O components 414 include a microphone, mouse, keyboard, joystick, game pad, game controller, satellite dish, scanner, printer, wireless device, etc. The I/O components 414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 400. The computing device 400 may include depth cameras, such as stereoscopic camera systems, infrared camera systems, RGB camera systems, touchscreen technology, and combinations of these, for gesture detection and recognition. Additionally, the computing device 400 may include accelerometers or gyroscopes (e.g., as part of an inertia measurement unit (IMU)) that enable detection of motion. In some examples, the output of the accelerometers or gyroscopes may be used by the computing device 400 to render immersive augmented reality or virtual reality.

The power supply 416 may include a hard-wired power supply, a battery power supply, or a combination thereof. The power supply 416 may provide power to the computing device 400 to enable the components of the computing device 400 to operate.

The presentation component(s) 418 may include a display (e.g., a monitor, a touch screen, a television screen, a heads-up-display (HUD), other display types, or a combination thereof), speakers, and/or other presentation components. The presentation component(s) 418 may receive data from other components (e.g., the GPU(s) 408, the CPU(s) 406, etc.), and output the data (e.g., as an image, video, sound, etc.).

Example Data Center

Figure 5:
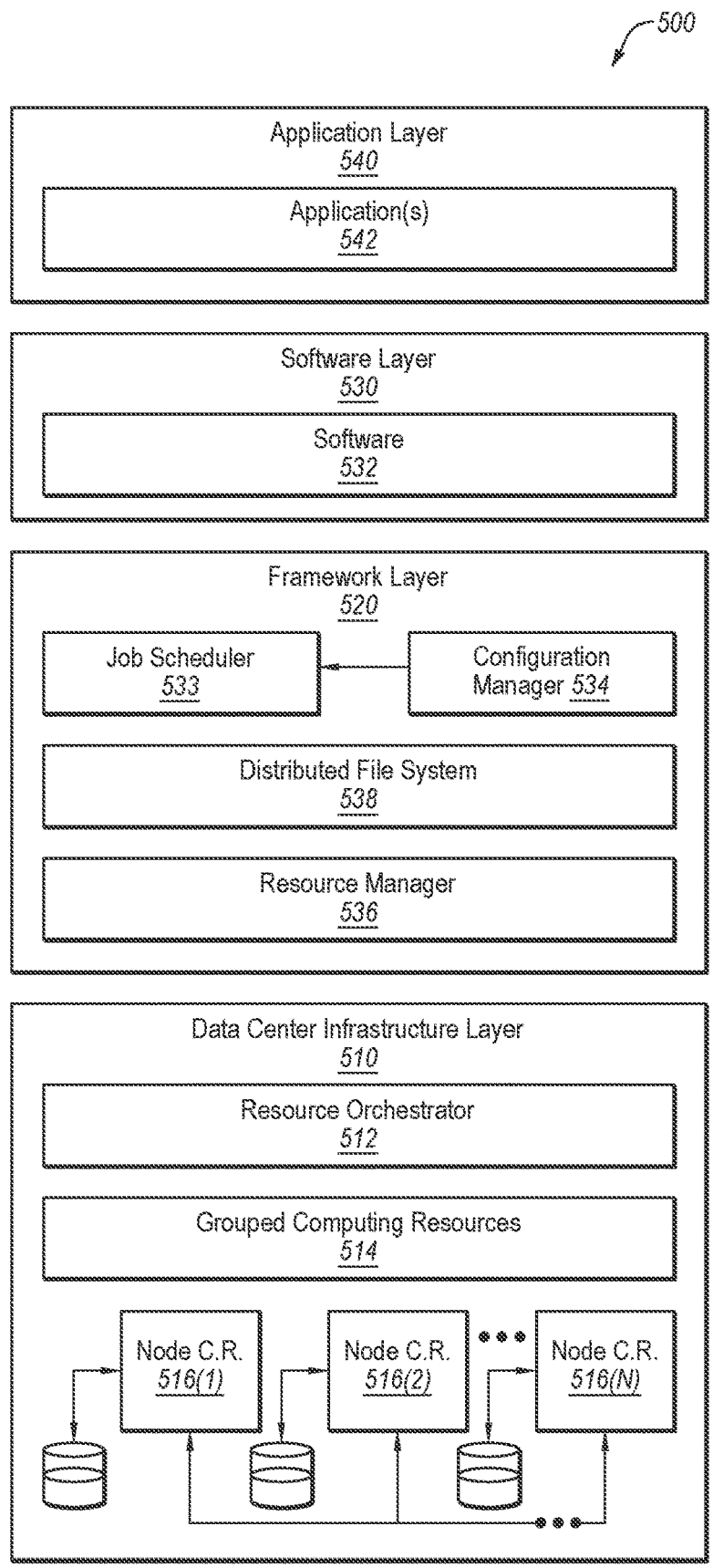
FIG. 5 is a block diagram of an example data center suitable for use in implementing some embodiments of the present disclosure.

FIG. 5 illustrates an example data center 500 that may be used in at least one embodiments of the present disclosure. The data center 500 may include a data center infrastructure layer 510, a framework layer 520, a software layer 530, and/or an application layer 540.

As shown in FIG. 5, the data center infrastructure layer 510 may include a resource orchestrator 512, grouped computing resources 514, and node computing resources ("node C.R.s") 516(1) 516(N), where "N" represents any whole, positive integer. In at least one embodiment, node C.R.s 516(1) 516(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 516(1) 516(N) may correspond to a server having one or more of the above-mentioned computing resources. In addition, in some embodiments, the node C.R.s 516(1) 516(N) may include one or more virtual components, such as vGPUs, vCPUs, and/or the like, and/or one or more of the node C.R.s 516(1) 516(N) may correspond to a virtual machine (VM).

In at least one embodiment, grouped computing resources 514 may include separate groupings of node C.R.s 516 housed within one or more racks (not shown), or many racks housed in data centers at various geographical locations (also not shown). Separate groupings of node C.R.s 516 within grouped computing resources 514 may include grouped compute, network, memory or storage resources that may be configured or allocated to support one or more workloads. In at least one embodiment, several node C.R.s 516 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 512 may configure or otherwise control one or more node C.R.s 516(1) 516(N) and/or grouped computing resources 514. In at least one embodiment, resource orchestrator 512 may include a software design infrastructure (SDI) management entity for the data center 500. The resource orchestrator 512 may include hardware, software, or some combination thereof.

In at least one embodiment, as shown in FIG. 5, framework layer 520 may include a job scheduler 533, a configuration manager 534, a resource manager 536, and/or a distributed file system 538. The framework layer 520 may include a framework to support software 532 of software layer 530 and/or one or more application(s) 542 of application layer 540. The software 532 or application(s) 542 may respectively include web-based service software or applications, such as those provided by Amazon Web Services, Google Cloud and Microsoft Azure. The framework layer 520 may be, but is not limited to, a type of free and open-source software web application framework such as Apache Spark™ (hereinafter "Spark") that may utilize distributed file system 538 for large-scale data processing (e.g., "big data"). In at least one embodiment, job scheduler 533 may include a Spark driver to facilitate scheduling of workloads supported by various layers of data center 500. The configuration manager 534 may be capable of configuring different layers such as software layer 530 and framework layer 520 including Spark and distributed file system 538 for supporting large-scale data processing. The resource manager 536 may be capable of managing clustered or grouped computing resources mapped to or allocated for support of distributed file system 538 and job scheduler 533. In at least one embodiment, clustered or grouped computing resources may include grouped computing resource 514 at data center infrastructure layer 510. The resource manager 536 may coordinate with resource orchestrator 512 to manage these mapped or allocated computing resources.

In at least one embodiment, software 532 included in software layer 530 may include software used by at least portions of node C.R.s 516(1) 516(N), grouped computing resources 514, and/or distributed file system 538 of framework layer 520. One or more types of software may include, but are not limited to, Internet web page search software, e-mail virus scan software, database software, and streaming video content software.

In at least one embodiment, application(s) 542 included in application layer 540 may include one or more types of applications used by at least portions of node C.R.s 516(1) 516(N), grouped computing resources 514, and/or distributed file system 538 of framework layer 520. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 534, resource manager 536, and resource orchestrator 512 may implement any number and type of self-modifying actions based on any amount and type of data acquired in any technically feasible fashion. Self-modifying actions may relieve a data center operator of data center 500 from making possibly bad configuration decisions and possibly avoiding underutilized and/or poor performing portions of a data center.

The data center 500 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 500. In at least one embodiment, trained or deployed machine learning models corresponding to one or more neural networks may be used to infer or predict information using resources described above with respect to the data center 500 by using weight parameters calculated through one or more training techniques, such as but not limited to those described herein.

In at least one embodiment, the data center 500 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 400 of FIG. 4—e.g., each device may include similar components, features, and/or functionality of the computing device(s) 400. In addition, where backend devices (e.g., servers, NAS, etc.) are implemented, the backend devices may be included as part of a data center 500, an example of which is described in more detail herein with respect to FIG. 5.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 400 described herein with respect to FIG. 4. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Further, use of the term "based at least on" in the present disclosure or claims does not mean that omission of "at least" in other places term means "only". For example, use of the term "based on X" in the present disclosure or claims may also mean "based at least on X" even though the term "at least" is not used in the particular instance but is used elsewhere.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
performing a first system test on a first processing element of an integrated processing system based at least on accessing, using a first local test controller, a first test node associated with the first processing element, the first local test controller being dedicated for the first test node and the first processing element; and
performing, independent of and at least partially during the first system test, a second system test on a second processing element of the integrated processing system based at least on accessing, using a second local test controller, a second test node associated with the second processing element, the second local test controller being dedicated for the second test node and the second processing element.

2. The method of claim 1, wherein one or more of the first system test or the second system test includes a runtime in-system test.

3. The method of claim 1, wherein the first system test is performed based at least on test instructions that direct performance of the first system test and that are obtained from a memory associated with the first local test controller.

4. The method of claim 3, further comprising converting the test instructions obtained from the first local test controller from a first format to a second format prior to the first system test.

5. The method of claim 1, wherein a first output associated with the first system test from the first local test controller is input to the first test node in an active state of the first local test controller and a second output not associated with the first system test from a global test controller is input to the first test node in an inactive state of the first local test controller.

6. The method of claim 1, further comprising:
in response to receiving a first signal from the first local test controller, configuring one or more registers associated with the first test node into a first mode associated with the performing the first system test; and
in response to receiving a second signal from the first local test controller, configuring the one or more registers associated with the first test node into a second mode associated with an operation other than the first system test.

7. An integrated system comprising:
a first processing element cluster that includes one or more first processing elements;
a second processing element cluster that includes one or more second processing elements;
a first test node associated with the first processing element cluster;
a second test node associated with the second processing element cluster;
a first local test controller associated with the first test node, the first local test controller to locally perform a first system test on the first processing element cluster using the first test node;
a second local test controller associated with the second test node and separate from the first local test controller, the second local test controller to locally perform a second system test on the second processing element cluster using the second test node; and
a global test controller communicatively coupled to the first test node and the second test node to control a global system test that includes testing the first processing element cluster and the second processing element cluster.

8. The system of claim 7, further comprising:
a first memory device associated with the first local test controller, the first memory device including first test instructions associated with the first test node corresponding to the first system test; and
a second memory device associated with the second local test controller, the second memory device including second test instructions associated with the second test node corresponding to the second system test.

9. The system of claim 7, further comprising:
a first data converter associated with the first local test controller, the first data converter to convert a first output of the first local test controller from a first format to a second format; and
a second data converter associated with the second local test controller, the second data converter to convert a second output from the second local test controller from the first format to the second format.

10. The system of claim 7, further comprising:
a data selector configured to select between a first selector mode and a second selector mode, the first selector mode including allowing communication of data between the first local test controller and the first processing element cluster, and the second selector mode including allowing communication of data between a data bus and the first processing element cluster.

11. The system of claim 10, wherein in response to the first local test controller being in an active state, the data selector selects the first selector mode.

12. The system of claim 7, further comprising one or more registers associated with the first test node, wherein:
in response to receiving a first signal from the first local test controller, the one or more registers enter a first register mode associated with performing the first system test, and
in response to receiving a second signal from the first local test controller, the one or more registers enter a second register mode that is associated with performing an operation other than the first system test.

13. The system of claim 7, wherein the system comprises one or more of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

14. A system comprising:
a first processing element cluster that includes one or more first processing elements; and
a local test controller communicatively coupled to and assigned to the first processing element cluster, the local test controller to perform a local system test on the first processing element cluster while a second processing element cluster of a same integrated system as the first processing element cluster, including one or more second processing elements, continues operation independent of the system test.

15. The system of claim 14, further comprising a joint test action group (JTAG) node communicatively coupled to the local test controller and the first processing element cluster, wherein the local test controller is communicatively coupled to the first processing element cluster via the JTAG node.

16. The system of claim 15, further comprising a data converter associated with the JTAG node and communicatively coupled to the local test controller, the data converter to convert an output having a first format corresponding to the local test controller to a second format prior to the system test.

17. The system of claim 15, further comprising one or more registers associated with the JTAG node, wherein in response to receiving a first signal from the local test controller, the one or more registers enter a first mode, and in response to receiving a second signal from the local test controller, the one or more registers enter a second mode.

18. The system of claim 14, further comprising a memory device associated with the local test controller, the memory device including test instructions associated with the one or more first processing elements included in the first processing element cluster corresponding to the system test.

19. The system of claim 14, wherein the system comprises one or more of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

* * * * *